(12) United States Patent
Abe

(10) Patent No.: US 7,854,429 B2
(45) Date of Patent: Dec. 21, 2010

(54) APPARATUS FOR TRANSFERRING SHEET

(75) Inventor: Etsuro Abe, Kasugai (JP)

(73) Assignee: Kabushiki Kaisha Isowa, Aichi (JP)

( * ) Notice: Subject to any disclaimer, the term of this patent is extended or adjusted under 35 U.S.C. 154(b) by 36 days.

(21) Appl. No.: 12/365,724

(22) Filed: Feb. 4, 2009

(65) Prior Publication Data

US 2009/0174138 A1 Jul. 9, 2009

(30) Foreign Application Priority Data

Jan. 7, 2008 (JP) .............................. 2008-000481

(51) Int. Cl.
 *B65H 5/02* (2006.01)
(52) U.S. Cl. ...................... 271/276; 198/689.1; 198/811
(58) Field of Classification Search .................. 271/275, 271/276; 198/689.1, 811
 See application file for complete search history.

(56) References Cited

U.S. PATENT DOCUMENTS

| | | | | |
|---|---|---|---|---|
| 3,889,801 A | * | 6/1975 | Boyer ...................... | 198/689.1 |
| 4,154,438 A | * | 5/1979 | Seragnoli .................... | 271/12 |
| 4,645,069 A | * | 2/1987 | Sjogren .................... | 198/689.1 |
| 4,651,984 A | * | 3/1987 | Emrich ........................ | 271/237 |
| 4,730,526 A | | 3/1988 | Pearl et al. | |
| 5,234,097 A | * | 8/1993 | Okuyama .................... | 198/434 |
| 5,765,679 A | * | 6/1998 | Greive ........................ | 198/834 |
| 5,779,236 A | * | 7/1998 | Duncan et al. ............... | 271/276 |
| 6,102,191 A | * | 8/2000 | Janzen et al. ............. | 198/689.1 |
| 6,708,970 B2 | | 3/2004 | Valterio et al. | |
| 7,004,309 B2 | * | 2/2006 | Sherwood .................... | 198/813 |
| 2005/0109588 A1 | * | 5/2005 | Gariglio ....................... | 198/817 |
| 2006/0021858 A1 | * | 2/2006 | Sherwood .................... | 198/813 |

FOREIGN PATENT DOCUMENTS

| EP | 0 499 455 A2 | 8/1992 |
|---|---|---|
| GB | 2 071 063 A | 9/1981 |

(Continued)

OTHER PUBLICATIONS

Extended European Search Report for European patent appln. No. 09000099.3 (Mar. 6, 2009).

*Primary Examiner*—Kaitlin S Joerger
(74) *Attorney, Agent, or Firm*—Stroock & Stroock & Lavan LLP

(57) ABSTRACT

The present invention is directed to providing an apparatus capable of transferring a sheet while reducing wear and using a relatively small driving force. The present invention is also directed to providing an apparatus capable of effectively obtaining a vacuum suction force with a simple structure. An apparatus 1 for transferring a sheet according to the present invention comprises a conveyer belt 30 provided with a plurality of vacuum suction holes 30c for allowing the belt member to vacuum-suck a sheet using an evacuation mechanism 12, a belt support member 8 having a plurality of evacuation passages 8c communicated with the vacuum suction holes, and a sheet support member 4 adapted to support the sheet in such a manner as to define an interspace between an uppermost region of an outer peripheral surface of the conveyer belt and a bottom surface of the sheet when the evacuation mechanism is in a deactivated state, whereby, when the evacuation mechanism is in an activated state, an air in the interspace S between the conveyer belt and the sheet D is evacuated from the vacuum suction holes and through the evacuation passages, so that the conveyer belt is displaced upwardly by a resulting vacuum suction force to transfer the sheet while vacuum-sucking the sheet.

18 Claims, 12 Drawing Sheets

FOREIGN PATENT DOCUMENTS

| | | |
|---|---|---|
| JP | 04-72918 U | 6/1992 |
| JP | 2008-019094 | 1/2008 |

* cited by examiner

APPARATUS FOR TRANSFERRING SHEET

BACKGROUND OF THE INVENTION

1. Field of the Invention

The present invention relates to a sheet transfer apparatus, and more specifically to an apparatus for transferring a sheet from an upstream side to a downstream side by use of a belt member.

2. Description of the Background Art

Heretofore, there has been known a belt conveyer apparatus as disclosed in the following Patent Document 1. This type of belt conveyer apparatus is designed such that a timing belt is slidingly moved on a vacuum suction slit-apertured wall of an evacuation duct.

[Patent Document 1] JU 04-072918A

In the above belt conveyer apparatus, the timing belt itself is strongly brought into press contact with the apertured wall by a vacuum suction force to cause strong friction therebetween, which can accelerate wear, and leads to a need for a relatively large driving force.

Moreover, in an operation of cutting a sheet being continuously fed, it is necessary to allow the sheet to be accurately transferred while being accurately placed at a prescribed position on the conveyer.

SUMMARY OF THE INVENTION

In view of the above circumstances, it is an object of the present invention to provide an apparatus capable of accurately transferring a sheet while reducing wear and using a relatively small driving force. It is another object of the present invention to provide an apparatus capable of more effectively obtaining a vacuum suction force with a simple structure.

In order to achieve these objects, according to a first aspect of the present invention, there is provided a sheet transfer apparatus which comprises: an evacuation mechanism; a belt member provided with a plurality of vacuum suction openings for allowing the belt member to vacuum-suck a sheet and transfer the vacuum-sucked sheet when the evacuation mechanism is in an activated state; a communication mechanism communicating the evacuation mechanism and the respective vacuum suction openings; a belt support member adapted, when the evacuation mechanism is in a deactivated state, to support the belt member from therebeneath; and a sheet support member adapted to support the sheet at a height position higher than that of an uppermost region of an outer peripheral surface of the belt member by a given distance, in such a manner as to define an interspace between the uppermost region of the outer peripheral surface of the belt member and a bottom surface of the sheet when the evacuation mechanism is in the deactivated state, whereby, when the evacuation mechanism is in the activated state, an air in the interspace between the belt member and the sheet is evacuated from the vacuum suction openings and through the communication mechanism, so that the belt member is displaced upwardly relative to the belt support member by a resulting vacuum suction force to transfer the sheet while vacuum-sucking the sheet.

In the first aspect of the present invention, each of the vacuum suction openings may have any configuration capable of creating a vacuum suction force for holding the sheet. For example, the vacuum suction opening may be a vacuum suction hole, or may be an opening of a grooved portion of the belt member opposed to the sheet. The belt member may be a conveyer belt itself, or may be a combination of a conveyer belt and other type of belt, such as a sealing belt. The belt support member may be any type capable of supporting the belt member from therebeneath. For example, the belt support member may be a plate-shaped support plate, or may be a member having a concave-convex surface. The sheet support member may be any type capable of supporting the sheet. For example, the sheet support member may be a pair of members adapted to support at the sheet at two points, or may be a member adapted to support at the sheet at two points or more. In the first aspect of the present invention, a state when the belt member is displaced upwardly relative to the belt support member means a state when the belt member is displaced away from the belt support member and located at a position where almost no frictional force acts between the belt member and the belt support member.

In order to achieve the above objects, according to a second aspect of the present invention, there is provided a sheet transfer apparatus which comprises: an evacuation mechanism; a belt member formed with a plurality of cavities each having a respective at least one of a plurality of vacuum suction holes for allowing the belt member to vacuum-suck a sheet and transfer the vacuum-sucked sheet when the evacuation mechanism is in an activated state; a communication mechanism having a plurality of evacuation passages each communicating the evacuation mechanism and a respective one of the cavities; a belt support member adapted, when the evacuation mechanism is in a deactivated state, to support the belt member from therebeneath displaceably in an upward-downward direction; and a sheet support member adapted to support the sheet at a height position higher than that of an uppermost region of an outer peripheral surface of the belt member by a given distance by a given distance, in such a manner as to define an interspace between the uppermost region of the outer peripheral surface of the belt member and a bottom surface of the sheet when the evacuation mechanism is in the deactivated state, whereby, when the evacuation mechanism is in the activated state, an air in the interspace between the belt member and the sheet is evacuated from the vacuum suction holes and through the cavities and the evacuation passages, so that the belt member is displaced upwardly relative to the belt support member by a resulting vacuum suction force to transfer the sheet while vacuum-sucking the sheet.

In the second aspect of the present invention, the evacuation passages may be provided in any location capable of evacuating an air in the interspace through the cavities. For example, the evacuation passages may be provided in the belt support member, or may be provided in the sheet support member.

In order to achieve the above objects, according to a third aspect of the present invention, there is provided a sheet transfer apparatus for feeding a sheet from an upstream side to a downstream side along a given transfer track. This sheet transfer apparatus comprises: an evacuation mechanism; a belt member formed with a plurality of cavities each of which extends in a lateral direction across the given transfer track and has a respective at least one of a plurality of vacuum suction holes for allowing the belt member to vacuum-suck the sheet and transfer the vacuum-sucked sheet when the evacuation mechanism is in an activated state; a belt support plate adapted, when the evacuation mechanism is in a deactivated state, to support the belt member from therebeneath displaceably in an upward-downward direction; a pair of sheet support members disposed on respective opposite sides of the belt member, and adapted to support the sheet at a height position higher than that of an uppermost region of an outer peripheral surface of the belt member by a given distance, in such a manner as to define an interspace between the uppermost region of the outer peripheral surface of the belt member and a bottom surface of the sheet when the evacuation mechanism is in the deactivated state; and a communication mechanism having a plurality of evacuation passages provided in the sheet support members and communicated with the respective cavities in the lateral direction so as to communicate the evacuation mechanism and the respective cavities, whereby, when the evacuation mechanism is in the activated state, an air in the interspace between the belt member and the sheet is evacuated from the vacuum suction holes and through the cavities and the evacuation passages, so that the belt member is displaced upwardly relative to the belt support plate by a resulting vacuum suction force to transfer the sheet while vacuum-sucking the sheet.

In order to achieve the above objects, according to a fourth aspect of the present invention, there is provided a sheet transfer apparatus for feeding a sheet from an upstream side to a downstream side. This sheet transfer apparatus comprises: an evacuation mechanism; a belt member provided with a plurality of vacuum suction holes to allow the belt member to vacuum-suck the sheet and transfer the vacuum-sucked sheet, in response to activating the evacuation mechanism; a belt support member adapted, when the evacuation mechanism is in a deactivated state, to support the belt member from thereneath, and provided with a plurality of evacuation passages communicating the evacuation mechanism and the respective vacuum suction holes of the belt member; and a pair of sheet support members disposed on respective opposite sides of the belt member, and adapted to support the sheet at a height position higher than that of an uppermost region of an outer peripheral surface of the belt member by a given distance, in such a manner as to define an interspace between the uppermost region of the outer peripheral surface of the belt member and a bottom surface of the sheet when the evacuation mechanism is in the deactivated state, whereby, in response to activating the evacuation mechanism, an air in the interspace between the belt member and the sheet is evacuated from the vacuum suction holes and through the evacuation passages, so that the belt member is displaced upwardly by a resulting vacuum suction force to vacuum-suck the sheet and transfer the sheet.

In the fourth aspect of the present invention, an air in the interspace between the belt member and the sheet is evacuated from the vacuum suction holes, and therefore the belt member is displaced upwardly to vacuum-suck the sheet and transfer the sheet. Thus, no frictional force acts between the belt member and the belt support member, and a load of the sheet is not largely applied to the belt member. This makes it possible to accurately transfer the sheet with a smaller driving force than ever before.

Preferably, in the sheet transfer apparatus of the present invention, the belt member is a timing belt having an inner peripheral surface which is provided with a plurality of inner cogs each formed to extend in a widthwise direction thereof and arranged side-by-side in a transfer direction, in such a manner as to be engageable with a driving roll, and a plurality of inner grooves defined between adjacent ones of the inner cogs, and wherein each of the vacuum suction holes is formed correspondingly to a respective one of the inner grooves, whereby, in response to activating the evacuation mechanism, an air in the interspace between the belt member and the sheet is evacuated through the vacuum suction holes, the inner grooves and the evacuation passages.

According to this feature, the plurality of inner grooves formed to extend in the widthwise direction of the belt member and arranged side-by-side in the transfer direction are provided on the inner peripheral surface of the belt member. This makes it possible to allow an air between the belt member and the sheet to be smoothly evacuated through the vacuum suction holes and the corresponding inner grooves. In this case, the air is evacuated through the vacuum suction holes formed correspondingly to the inner grooves of the belt member, the inner grooves of the belt member, and the evacuation passage communicating the evacuation mechanism and the respective vacuum suction holes of the belt member, so as to effectively obtain a vacuum suction force for holding the sheet. Further, when the belt member is a type engageable with a driving roll, it can be moved in synchronization with driving of a motor for the driving roll.

Preferably, the sheet transfer apparatus of the present invention further comprises a sealing belt disposed between the belt support member and the belt member, and adapted to be displaced upwardly together with the belt member to seal the inner grooves, wherein the belt support member is formed with a vent hole for allowing air to get into and out from between the belt support member and the sealing belt.

According to this feature, the sealing belt is displaced upwardly together with the belt member to seal the inner grooves of the belt member, so as to prevent vacuum leakage (intrusion of air) to avoid decrease in vacuum suction force. Further, the vent hole for allowing air to get into and out from between the belt support member and the sealing belt is formed in the belt support member. Thus, when the sealing belt is displaced upwardly according to a vacuum suction force, no negative pressure is generated between the belt support member and the sealing belt to facilitate the upward displacement of the sealing belt. This makes it possible to more effectively maintain a higher vacuum suction force.

Preferably, in the sheet transfer apparatus of the present invention, each of the sheet support members is formed with an elongate groove having a thickness approximately equal to that of the sealing belt and extending in the transfer direction, and the sealing belt is fittingly received in the elongate grooves.

According to this feature, the sealing belt is fittingly received in the elongate grooves each having a thickness approximately equal to that of the sealing belt and extending in the transfer direction. This makes it possible to effectively prevent vacuum leakage.

Preferably, the sheet transfer apparatus of the present invention further comprises an air guide bar disposed on a widthwise intermediate portion of the belt support member to extend in the transfer direction, and formed with a plurality of first paths each extending in a widthwise direction thereof, and a plurality of second paths each having an upper open end communicated with a corresponding one of the first paths and extending downwardly from the upper open end to have a lower open end oriented downwardly, wherein each of the evacuation passages is formed in the widthwise intermediate portion of the belt support member and beneath a respective at least one of the second paths, and wherein each of the first paths is communicated with a respective at least one of the inner grooves, and each of the second paths is communicated with a respective one of the evacuation passages, whereby, in response to activating the evacuation mechanism, an air in the interspace between the belt member and the sheet is evacuated through the vacuum suction holes, the inner grooves, the first and second paths and the evacuation passages.

According to this feature, the air guide bar disposed on the widthwise intermediate portion of the belt support member has the second paths each having the downwardly oriented lower open end communicated with a respective one of the evacuation passages of the belt support member, and the first paths each communicated with a corresponding one of the second paths and formed to extend in the widthwise direction of the belt support member, and each of the first paths is communicated with a respective at least one of the inner grooves. Thus, an air between the belt member and the sheet is more effectively evacuated through the vacuum suction holes of the belt member, the inner grooves of the belt member, the first paths of the air guide bar, the second paths of the air guide bar and the evacuation passages of the belt support member. Further, as compared with a structure designed to evacuate the air from the respective sides of the sheet support members, the air guide bar disposed on the widthwise intermediate portion of the belt support member makes it possible to reduce vacuum leakage to effectively obtain a desired vacuum suction force. In addition, a production cost can be reduced as compared with the structure designed to evacuate the air from the respective sides of the sheet support members.

Preferably, in the sheet transfer apparatus of the present invention, the outer peripheral surface of the belt member is provided with a plurality of outer cogs each formed to extend in the widthwise direction thereof and arranged side-by-side in the transfer direction, and a plurality of outer grooves defined between adjacent ones of the outer cogs, whereby, in response to activating the evacuation mechanism, an air in the interspace between the belt member and the sheet is evacuated through the outer grooves, the vacuum suction holes, the inner grooves and the evacuation passages.

According to this feature, the outer grooves each formed to extend in the widthwise direction of the belt member and arranged side-by-side in the transfer direction are provided on the outer peripheral surface of the belt member. This makes it possible to increase a contact area between the sheet and a vacuum atmosphere to effectively obtain a vacuum suction force for holding the sheet and more reliably transfer the sheet.

Preferably, the sheet transfer apparatus of the present invention further comprises an air guide bar disposed on a widthwise intermediate portion of the belt support member to extend in the transfer direction, and formed with a plurality of first paths each extending in a widthwise direction thereof, and a plurality of second paths each having an upper open end communicated with a corresponding one of the first paths and extending downwardly from the upper open end to have a lower open end oriented downwardly, wherein each of the evacuation passages is formed in the widthwise intermediate portion of the belt support member and beneath a respective at least one of the second paths, and the outer peripheral surface of the belt member is provided with a plurality of outer cogs each formed to extend in the widthwise direction thereof and arranged side-by-side in the transfer direction, and a plurality of outer grooves defined between adjacent ones of the outer cogs, and wherein each of the outer grooves is communicated with a respective at least one of the vacuum suction holes formed correspondingly to the inner grooves, each of the inner grooves being communicated with a respective at least one of the first paths, and each of the second paths being communicated with a respective one of the evacuation passages, whereby, in response to activating the evacuation mechanism, an air in the interspace between the belt member and the sheet is evacuated through the outer grooves, the vacuum suction holes, the inner grooves, the first and second paths and the evacuation passages.

According to this feature, the air guide bar disposed on the widthwise intermediate portion of the belt support member has the second paths each having the downwardly oriented lower open end communicated with a respective one of the evacuation passages of the belt support member, and the first paths each communicated with a corresponding one of the second paths and formed to extend in the widthwise direction of the belt support member, and each of the first paths is communicated with a respective at least one of the inner grooves. Further, the outer grooves communicated with the respective vacuum suction holes are formed on the outer peripheral surface of the belt member. This makes it possible to increase a contact area between the sheet and a vacuum atmosphere to effectively obtain a vacuum suction force for holding the sheet, and allow an air between the belt member and the sheet to be more effectively evacuated through the outer grooves, the vacuum suction holes, the inner grooves, the first paths of the air guide bar, the second paths of the air guide bar and the evacuation passages of the belt support member.

Preferably, in the sheet transfer apparatus of the present invention, the outer peripheral surface of the belt member is formed in a flat shape capable of carrying the sheet.

According to this feature, the outer peripheral surface of the belt member is formed in a flat shape capable of carrying the sheet. This makes it possible to increase a contact area with the sheet to more reliably transfer the sheet.

Preferably, in the sheet transfer apparatus of the present invention, the sealing belt is disposed across of the air guide bar.

This feature makes it possible to satisfy both of effective evacuation based on the air guide bar and maintenance of a high vacuum suction force based on the sealing belt disposed across the air guide bar.

Preferably, the sheet transfer apparatus of the present invention, the air guide bar is mounted in a mount groove formed in the widthwise intermediate portion of the belt support member to extend in the transfer direction.

According to this feature, a mounting position of the air guide bar can be determined by the mount groove. This makes it possible to more accurately communicate the air guide bar with the evacuation passages of the belt support member and with the inner grooves of the belt member, with a low-cost structure.

Preferably, the sheet transfer apparatus of the present invention further comprises a sealing plate provided between the air guide bar and the belt member to seal the air guide bar from thereabove, wherein the air guide bar has a plurality of grooves extending in the widthwise direction thereof and defining the first paths in cooperation with the sealing plate.

According to this feature, the first paths can be defined by a simple structure comprising a combination of the grooves of the air guide bar and the sealing plate.

Preferably, in the sheet transfer apparatus of the present invention, the belt member is formed as a single piece in the widthwise direction thereof and between the sheet support members, wherein the belt member has a recess formed in a bottom surface of the widthwise intermediate portion thereof to receive therein the sealing plate and at least a part of the air guide bar.

According to this feature, the belt member is formed as a single piece in the widthwise direction, and the recess is formed in the bottom surface of the widthwise intermediate portion of the belt member to receive therein the sealing plate and at least a part of the air guide bar. This makes it possible to obtain a sheet transfer apparatus having an enhanced air-sealing capability.

Preferably, in the sheet transfer apparatus of the present invention, the belt member includes a first belt member and a second belt member which are disposed on respective opposite sides of the sealing plate and at approximately the same height position, wherein each of the first and second belt members has opposite lateral surfaces sealed by the sealing plate and a corresponding one of the sheet support members.

According to this feature, the sheet can be more reliably supported and transferred by the two belt members disposed at approximately the same height position. Further, the opposite lateral surfaces of each of the two belt members sealed by the sealing plate and a corresponding one of the sheet support members. Thus, even if the belt member is composed of the two belt members, a desired vacuum suction force can be adequately maintained.

Preferably, in the sheet transfer apparatus of the present invention, each of the evacuation passages of the belt support member is formed as a through-hole penetrating through the belt support member in an upward-downward direction, and the evacuation mechanism includes an evacuation box disposed beneath the through-holes.

According to this feature, air can be efficiently evacuated using the evacuation passages each penetrating through the belt support member in the upward-downward direction, and the evacuation box disposed beneath the evacuation passages.

Preferably, in the sheet transfer apparatus of the present invention, each of the evacuation passages of the belt support member includes a first evacuation passage having an upper open end at a top surface of the belt support member and extending downwardly from the upper open end, a second evacuation passage communicated with a lower open end of the first evacuation passage and disposed below the first evacuation passage to extend a widthwise direction of the belt support member, and a third evacuation passage having an upper open end communicated with the second evacuation passage and a lower open end at a bottom of the belt support member, wherein the third evacuation passages are formed relative to the respective second evacuation passages at different positions in the widthwise direction, and the evacuation box of the evacuation mechanism comprises a plurality of evacuation boxes arranged in side-by-side relation corresponding to the positions of the third evacuation passages, in the widthwise direction.

According to this feature, each of the evacuation passages includes the first evacuation passage having the upper open end at the top surface of the belt support member and extending downwardly from the upper open end, and the second evacuation passage communicated with the lower open end of the first evacuation passage and disposed below the first evacuation passage to extend the widthwise direction of the belt support member. Further, the third evacuation passages are formed relative to the respective second evacuation passages at different positions in the widthwise direction, and the evacuation boxes of the evacuation mechanism are arranged in side-by-side relation corresponding to the positions of the third evacuation passages, in the widthwise direction. Thus, based on the evacuation boxes provided correspondingly to the respective third evacuation passages formed at different positions in the widthwise direction, a large vacuum suction force can be obtained. Further, the evacuation boxes arranged in side-by-side relation in the widthwise direction may be activated individually to adjust a vacuum suction force or change a position providing a vacuum suction force in the uppermost region of the outer peripheral surface of the belt member.

Preferably, the sheet transfer apparatus of the present invention is designed to continuously transfer a plurality of types of sheets each having a different length, wherein the belt member is adapted to allow a leading edge of each of the sheets to be placed at a given position thereof, and the vacuum suction holes are formed only in a sub-region extending from the given position in an upstream direction by a length of a shortest one of the sheets, in a region extending from the given position in the upstream direction by a length of a longest one of the sheets.

In a sheet transfer apparatus designed to continuously transfer a plurality of types of sheets each having a different length, if vacuum suction holes are provided in a region of the belt member on which the shortest sheet to be transferred is not placed, air will be uselessly evacuated. According to this feature, such an undesirable situation can be avoided, and the longest sheet can also be vacuum-sucked and transferred based on a vacuum suction force created by the vacuum suction holes provided in the sub-region extending by the length of the shortest sheet.

Preferably, in the sheet transfer apparatus of the present invention, each of the first paths of the air guide bar is formed in a shape having a width which gradually narrows toward a corresponding one of the second paths, in top plan view.

According to this feature, air can be more efficiently evacuated.

In order to achieve the above objects, according to a fifth aspect of the present invention, there is provided a sheet transfer apparatus for feeding a sheet from an upstream side to a downstream side. This sheet transfer apparatus comprises: an evacuation mechanism; a belt member adapted to be moved from the upstream side to the downstream side, wherein the belt member has an inner peripheral surface which is provided with a plurality of inner cogs each formed to extend in a widthwise direction thereof and arranged side-by-side in a transfer direction, and a plurality of inner grooves defined between adjacent ones of the inner cogs, and wherein the belt member has a plurality of vacuum suction holes formed correspondingly to the respective inner grooves to allow the belt member to vacuum-suck the sheet in response to activating the evacuation mechanism; a belt support member having a plurality of evacuation passages communicating the evacuation mechanism and the respective vacuum suction holes of the belt member; and an air guide bar disposed on a widthwise intermediate portion of the belt support member to extend in the transfer direction, and adapted to evacuate air from the vacuum suction holes through the inner grooves, wherein the air guide bar is formed with a plurality of first paths each extending in a widthwise direction thereof while being communicated with a respective at least one of the inner grooves, and a plurality of second paths each having an upper open end communicated with a corresponding one of the first paths and extending downwardly from the upper open end to have a lower open end oriented downwardly, whereby, in response to activating the evacuation mechanism, an air in an interspace between the belt member and the sheet is evacuated through the vacuum suction holes, the inner grooves, the first and second paths and the evacuation passages.

In the fifth aspect of the present invention, based on the vacuum suction holes of the belt member, the inner grooves of the belt member, the first and second paths formed in the air guide bar in such a manner as to be communicated with the respective inner grooves, and the evacuation passages formed in the belt support member in such a manner as to be communicated with to the respective second paths, a vacuum suction force for holding and transferring the sheet can be obtained more reliably and effectively with a simple structure.

Preferably, the sheet transfer apparatus of the present invention further comprises: a pair of sheet support members disposed on respective opposite sides of the belt member, and adapted to support the sheet at a height position higher than that of an uppermost region of an outer peripheral surface of the belt member by a given distance, in such a manner as to define an interspace between the uppermost region of the outer peripheral surface of the belt member and a bottom surface of the sheet when the evacuation mechanism is in the deactivated state, whereby, in response to activating the evacuation mechanism, an air in the interspace between the belt member and the sheet is evacuated from the vacuum suction holes and through the evacuation passages, so that the belt member is displaced upwardly by a resulting vacuum suction force to vacuum-suck the sheet and transfer the sheet; and a sealing belt disposed between the belt support member and the belt member, and adapted to be displaced upwardly together with the belt member to seal the inner grooves, wherein the belt support member is formed with a vent hole for allowing air to get into and out from between the belt support member and the sealing belt.

According to this feature, the sealing belt is displaced upwardly together with the belt member to seal the inner grooves of the belt member, so as to prevent vacuum leakage (intrusion of air) to avoid decrease in vacuum suction force. Further, the vent hole for allowing air to get into and out from between the belt support member and the sealing belt is formed in the belt support member. Thus, when the sealing belt is displaced upwardly according to a vacuum suction force, no negative pressure is generated between the belt support member and the sealing belt to facilitate the upward displacement of the sealing belt. This makes it possible to more effectively maintain a higher vacuum suction force.

Preferably, in the sheet transfer apparatus of the present invention, the outer peripheral surface of the belt member is provided with a plurality of outer cogs each formed to extend in the widthwise direction thereof and arranged side-by-side in the transfer direction, and a plurality of outer grooves defined between adjacent ones of the outer cogs, whereby, in response to activating the evacuation mechanism, an air in the interspace between the belt member and the sheet is evacuated through the outer grooves, the vacuum suction holes, the inner grooves, the first and second paths and the evacuation passages.

According to this feature, the outer grooves each formed to extend in the widthwise direction of the belt member and arranged side-by-side in the transfer direction are provided on the outer peripheral surface of the belt member. This makes it possible to increase a contact area between the sheet and a vacuum atmosphere to effectively obtain a vacuum suction force for holding the sheet and more reliably transfer the sheet.

Preferably, the sheet transfer apparatus of the present invention is designed to continuously transfer a plurality of types of sheets each having a different length, wherein the belt member is adapted to allow a leading edge of each of the sheets to be placed at a given position thereof, and the vacuum suction holes are formed only in a sub-region extending from the given position in an upstream direction by a length of a shortest one of the sheets, in a region extending from the given position in the upstream direction by a length of a longest one of the sheets.

In a sheet transfer apparatus designed to continuously transfer a plurality of types of sheets each having a different length, if vacuum suction holes are provided in a region of the belt member on which the shortest sheet to be transferred is not placed, air will be uselessly evacuated. According to this feature, such an undesirable situation can be avoided, and the longest sheet can also be vacuum-sucked and transferred based on a vacuum suction force created by the vacuum suction holes provided in the sub-region extending by the length of the shortest sheet.

In order to achieve the above objects, according to a sixth aspect of the present invention, there is provided a sheet transfer apparatus for feeding a sheet from an upstream side to a downstream side. This sheet transfer apparatus comprises: an evacuation mechanism; a belt member provided with a plurality of vacuum suction holes to allow the belt member to vacuum-suck the sheet and transfer the vacuum-sucked sheet, in response to activating the evacuation mechanism; and a belt support member having a plurality of evacuation passages communicating the evacuation mechanism and the respective vacuum suction holes of the belt member, wherein the belt member has an outer peripheral surface which is provided with a plurality of outer grooves each formed to extend in the widthwise direction thereof and arranged side-by-side in a transfer direction, and wherein the vacuum suction holes are formed correspondingly to the respective outer grooves, whereby, in response to activating the evacuation mechanism, an air in an interspace between the belt member and the sheet is evacuated through the outer grooves, the vacuum suction holes, the inner grooves, the first and second paths and the evacuation passages.

In the sixth aspect of the present invention, the outer grooves each formed to extend in the widthwise direction thereof and arranged side-by-side in the transfer direction are provided on the outer peripheral surface of the belt member. This makes it possible to increase a contact area between the sheet and a vacuum atmosphere to effectively obtain a vacuum suction force for holding the sheet and more reliably transfer the sheet. Thus, an air in an interspace between the outer grooves of the belt member and the sheet can be more effectively evacuated through the outer grooves, the vacuum suction holes, the inner grooves, the first and second paths and the evacuation passages.

As above, the present invention makes it possible to accurately transfer a sheet while reducing wear and using a relatively small driving force, and more effectively obtain a vacuum suction force with a simple structure.

DESCRIPTION OF THE PREFERRED EMBODIMENTS

With reference to the accompanying drawings, a sheet transfer apparatus of the present invention will now be described based on an embodiment thereof. Although the following description about a preferred embodiment will be made based on one example where a sheet is a corrugated paperboard sheet, the present invention may be applied to a transfer apparatus for any kind of sheet other than a corrugated paperboard sheet, such as corrugated plastic sheet, cardboard, resin sheet or iron (steel) sheet.

Firstly, a schematic configuration of a transfer apparatus 1 according to a first embodiment of the present invention will be described with reference to FIGS. 1 and 2.

Figure 1:
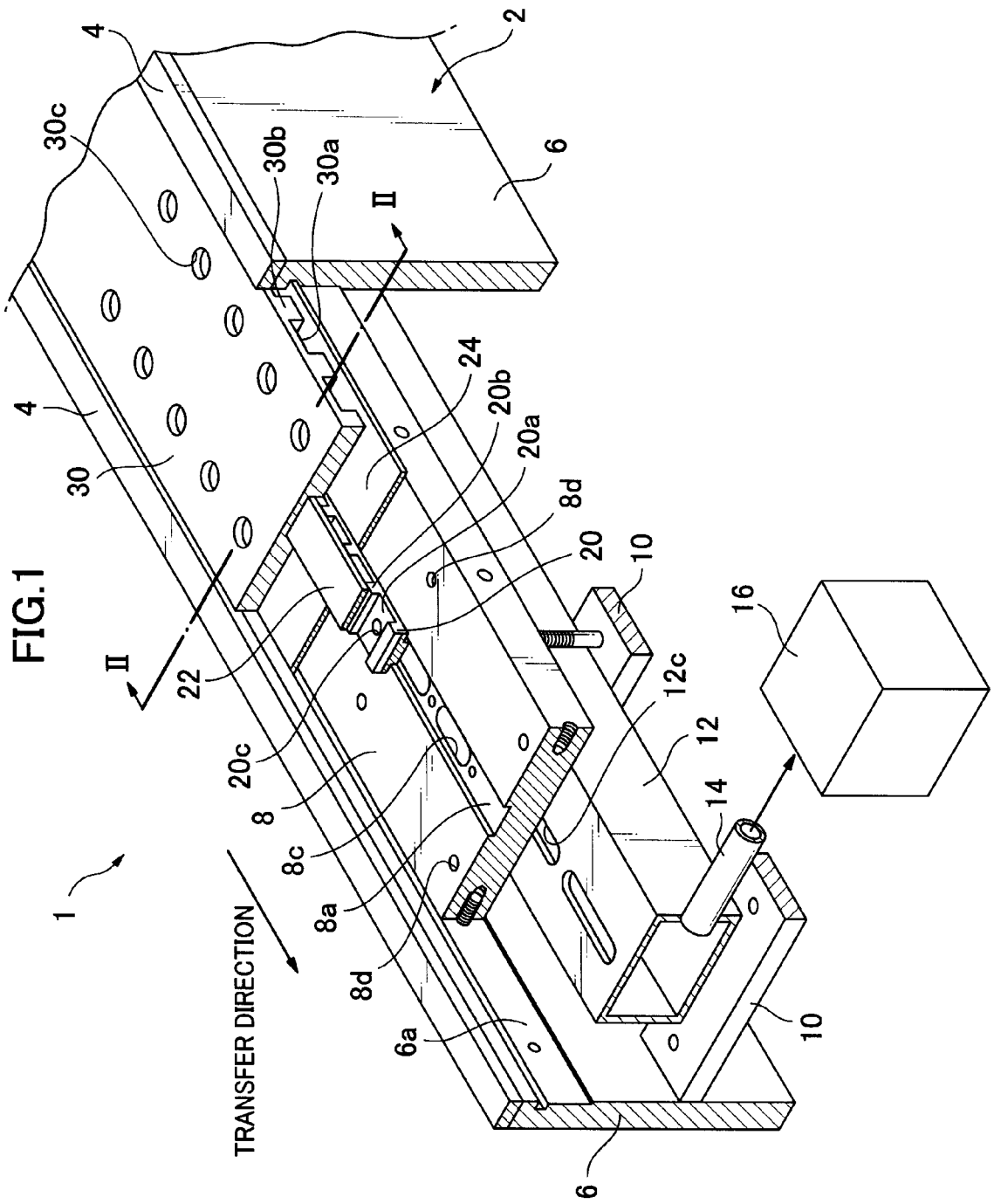
FIG. 1 is a fragmentary partially-broken perspective view showing a transfer apparatus according a first embodiment of the present invention.
Figure 2:
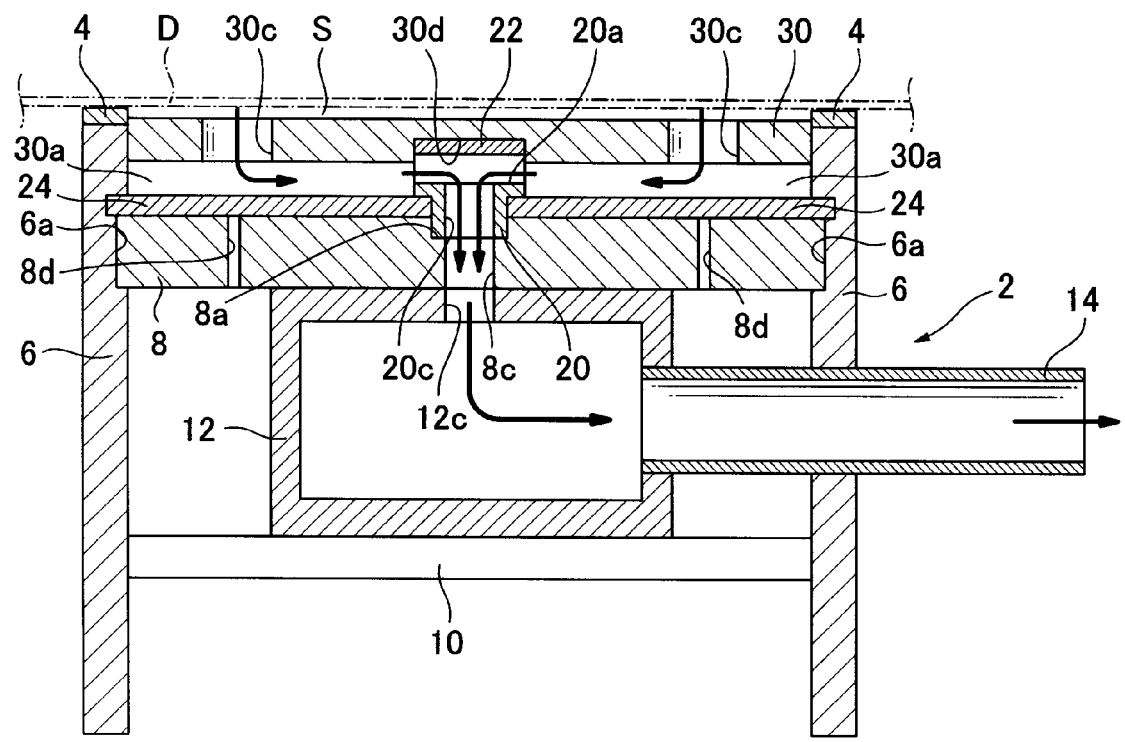
FIG. 2 is a sectional view showing the transfer apparatus according the first embodiment, taken along the line II-II in FIG. 1.

FIG. 1 is a fragmentary partially-broken perspective view showing the transfer apparatus according the first embodiment, and FIG. 2 is a sectional view showing the transfer apparatus according the first embodiment, taken along the line II-II in FIG. 1.

As shown in FIGS. 1 and 2, the transfer apparatus 1 according to the first embodiment comprises a top plate section 2 which includes a pair of top plate bodies 4 disposed in parallel, laterally spaced-apart relation to each other to extend in a transfer direction at the same height position, and a pair of top plate bases 6 each extending from a bottom surface of a corresponding one of the top plate bodies 4 vertically downwardly (the pair of top plate bodies 4 will hereinafter be referred to collectively as "top plate 4", and a combination of the top plate body 4 and the top plate base 6 on one side will hereinafter be referred to as "top plate assembly"). The top plate bases 6 have a pair of inside grooves 6a formed in respective ones of opposed inside surfaces thereof to extend in the transfer direction at the same height position. The inside grooves 6a fittingly receive therein respective ones of opposite lateral edges of a plate-shaped belt support member 8, and the belt support member 8 is fastened to each of the top plate bases 6 by fastening means, such as screws.

The transfer apparatus 1 further comprises an evacuation mechanism which includes: an evacuation box 12 fixed to the top plate bases 6 through a support plate 10 and further fixedly attached to the belt support member 8; and an evacuator 16 connected to the evacuation box 12 through an evacuation pipe 14 and adapted to evacuate air in the evacuation box 12. As shown in FIG. 2, the evacuation box 12 is fixedly attached to the belt support member 8 in such a manner that a top surface of the evacuation box 12 closely contacts a bottom surface of the belt support member 8.

The belt support member 8 has a cross-sectionally rectangular-shaped mount groove 8a formed in a top surface of a widthwise intermediate portion thereof to extend in the transfer direction. The mount groove 8a fittingly receives therein an air guide bar 20. The air guide bar 20 has a plurality of upper grooves 20a and a plurality of upper cogs 20b, as will be described in more detail later, and a sealing plate 22 is provided on the air guide bar 20 in such a manner that a bottom surface of the sealing plate 22 closely contacts respective top edges of the upper cogs 20b. The sealing plate 22 and a part of the air guide bar 20 are received in a recess 30d formed in a bottom surface of an after-mentioned conveyer belt 30.

The transfer apparatus 1 further comprises two sealing belts 24 disposed on respective opposite sides of the air guide bar 20 and inside the top plate section 2, and placed on a top surface of the belt support member 8 displaceably in an upward-downward direction. Each of the sealing belts 24 is adapted to be displaced upwardly together with the after-mentioned conveyer belt 30.

The transfer apparatus 1 further comprises a conveyer belt 30 provided on a top surface of the sealing plate 22 and an outer peripheral surface of each of the sealing belts 24. As shown in FIG. 1, the conveyer belt 30 has an inner peripheral surface which is provided with a plurality of inner grooves 30a each defined to extend in a width direction thereof and arranged side-by-side in the transfer direction, and a plurality of inner cogs 30b formed and arranged to define the inner grooves 30a between adjacent ones thereof.

Figure 13:
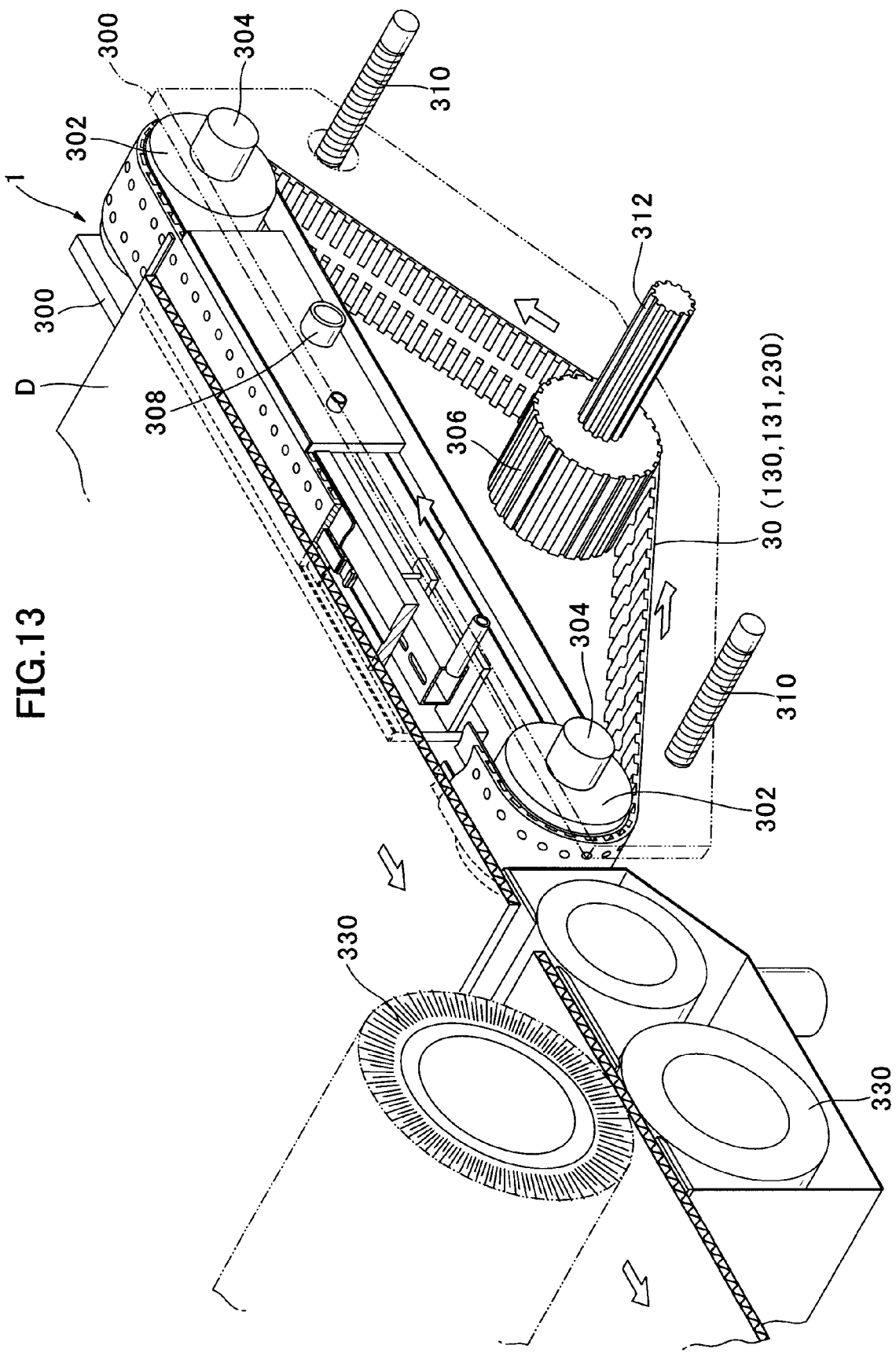
FIG. 13 is a perspective view showing a suction-type paperboard feeding system employing the transfer apparatus according to any one of the first to fourth embodiments.

The conveyer belt 30 is adapted to be circulatingly moved in the transfer direction in such a manner that the inner cogs 30b are sequentially engaged with a driving roll (see the reference numeral 306 in FIG. 13) and upstream and downstream driven rolls (see the reference numeral 302 in FIG. 13). That is, the conveyer belt 30 functions as a timing belt. It is understood that the driving and driven rolls may be used in any suitable arrangement other than that illustrated in FIG. 13.

The sealing belts 24 are adapted to be circulatingly moved in the transfer direction together with the conveyer belt 30, and the sealing plate 22 and the air guide bar 20 are mounted to the belt support member 8 without causing any relative displacement relative to the belt support member 8 (see FIG. 13).

Each of the components of the transfer apparatus 1 according to the first embodiment will be more specifically described with reference to FIGS. 1 and 2.

The top plate 4 is arranged such that a top surface thereof is located at a height position higher than that of an uppermost region of an outer peripheral surface of the conveyer belt 30 (i.e., a region of the outer peripheral surface of the conveyer belt 30 located on a downstream side in the transfer direction relative to the upstream driven roller 302 and between the upstream and downstream driven rollers 302 in FIG. 13). Specifically, the outer peripheral surface of the conveyer belt 30 is formed in a flat shape, and the conveyer belt 30 is arranged such that the uppermost region of the outer peripheral surface thereof is located at a height position slightly lower than that of the top surface of the top plate 4. For example, although a desired difference between the height positions varies depending on a width of the conveyer belt, it may be set in the range of about 0.1 to 1 mm, preferably in the range of 0.1 to 0.5 mm. Thus, an interspace S is defined between a bottom surface of a corrugated paperboard sheet D placed on the top plate 4 and the uppermost region of the outer peripheral surface of the conveyer belt 30. The corrugated paperboard sheet D, i.e., a sheet, is primarily supported by the top surface of the top plate 4.

As shown in FIGS. 1 and 2, the conveyer belt 30 is formed with a plurality of vacuum suction holes 30c for evacuating an air in the interspace S. The vacuum suction holes 30c are formed correspondingly to the respective inner grooves 30a defined on the inner peripheral surface of the conveyer belt 30. Thus, the air evacuated from the interspace S and through the vacuum suction holes 30c is firstly led into the inner grooves 30a.

The air guide bar 20 has the plurality of upper grooves 20a extending in the widthwise direction, as mentioned above, and a portion of the air guide bar 20 between the adjacent upper grooves 20a is formed with a hole (path) 20c penetrating through the air guide bar 20 in an upward-downward direction. Each of the upper grooves 20a is formed and arranged to be communicated with a respective at least one of the inner grooves 30a of the conveyer belt 30, so that the air evacuated from the interspace S and through the vacuum suction holes 30c is led into the upper grooves 20a of the air guide bar 20 via the inner grooves 30a of the conveyer belt 30.

The sealing plate 22 provided between the conveyer belt 30 and the upper grooves 20a of the air guide bar 20 is formed to seal the upper grooves 20a of the air guide bar 20, so that a plurality of first paths extending in the widthwise direction of the belt support member 8 are defined by the upper grooves 20a and the sealing plate 22. Each of the holes 20c of the air guide bar 20 is formed as a second path which has an upper open end communicated with a corresponding one of the first paths, and extends downwardly to have a lower open end oriented downwardly and communicated with a respective one of a plurality of after-mentioned holes (evacuation passages) 8c. Thus, as shown in FIG. 2, each of the upper groves 20a, i.e., first paths, is communicated with a respective at least one of the inner grooves 30a of the conveyer belt 30 and the corresponding one of the holes (second paths) 20c, to allow the air from the vacuum suction holes 30c to be evacuated through the inner grooves 30a, the upper grooves 20a and the holes 20c.

The belt support member 8 has a plurality of oval-shaped holes (evacuation passages) 8c each formed in a portion thereof defining a bottom of the mount groove 8a and at a position corresponding to a respective at least one of the holes 20c of the air guide bar 20. Each of the holes 8c is formed to penetrate through the belt support member 8 in an upward-downward direction, and the evacuation box 12 is provided beneath respective lower open ends of the holes 8c. The top surface of the evacuation box 12 is formed with a plurality of oval-shaped holes (evacuation passages) 12c at respective positions corresponding to the holes 8c of the belt support member 8. Thus, the air led into the first and second paths 20a, 20b of the air guide bar 20 is sucked into the evacuation box 12 via the holes 8c and the holes 12c.

The belt support member 8 also has a plurality of vent holes 8d each formed to penetrate therethrough in an upward-downward direction to have a lower open end communicated with ambient air. The vent holes 8d are provided as a means to allow ambient air to get into between the belt support member 8 and each of the sealing belts 24 when the sealing belts 24 are displaced upwardly together with the conveyer belt 30 according to a negative pressure, as will be described later, so as to prevent generation of a negative pressure therebetween to keep the upward displacement from being hindered.

Figure 3:
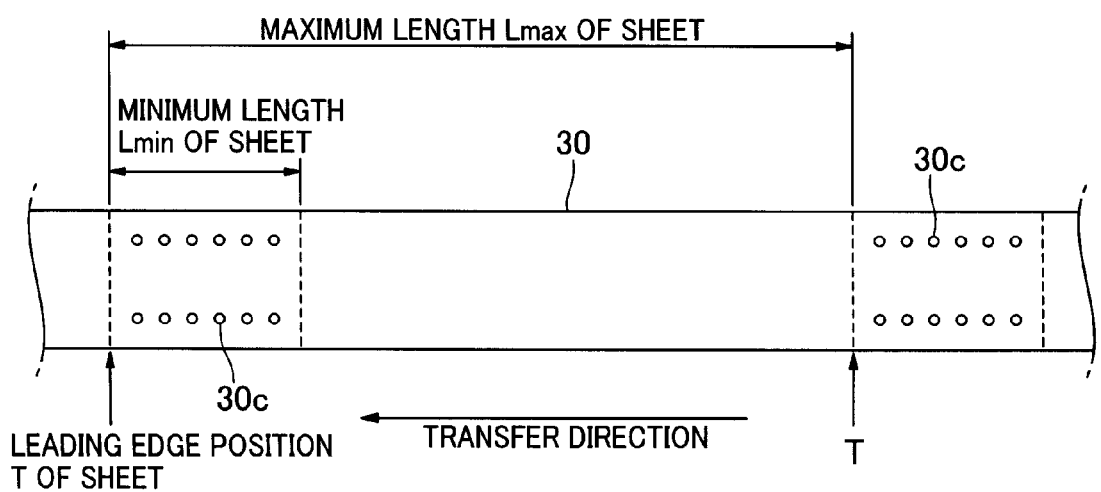
FIG. 3 is a top plan view schematically showing a conveyer belt of the transfer apparatus according the first embodiment.

With reference to FIG. 3, an arrangement of the vacuum suction holes 30c formed in the conveyer belt 30 will be described below. FIG. 3 is a top plan view showing only the conveyer belt of the transfer apparatus according the first embodiment.

The transfer apparatus 1 is designed to handle a plurality of types of corrugated paperboard sheets D each having a different length in the transfer direction. In this case, given that a shortest one of the corrugated paperboard sheets D in the transfer direction has a minimum length Lmin, and a longest one of the corrugated paperboard sheets D in the transfer direction has a maximum length Lmax. As shown in FIG. 3, the code T indicates a leading edge position, i.e., a position at which a leading edge of one of the corrugated paperboard sheets D is placed during transfer. In the first embodiment, the vacuum suction holes 30c are formed only in a region extending from a first leading edge position T to a position spaced apart from the first leading edge position T by the minimum length Lmin, without being formed in a region extending from the position spaced apart from the first leading edge position T by the minimum length Lmin, to a next leading edge position T (i.e., a position spaced apart from the first leading edge position T by the maximum length Lmax). This makes it possible to prevent air from being uselessly evacuated, for example, in an operation of transferring the shortest corrugated paperboard sheet D having the minimum length Lmin, because no vacuum suction hole is formed in a region of the conveyer belt 30 on which the corrugated paperboard sheet D is not placed (i.e., in the region extending from the position spaced apart from the leading edge position T by the minimum length Lmin, to the next leading edge position T). In addition, the longest corrugated paperboard sheet D having the maximum length Lmax can also be transferred using the vacuum suction holes 30c formed in the region extending by the minimum length Lmin.

Figure 4:
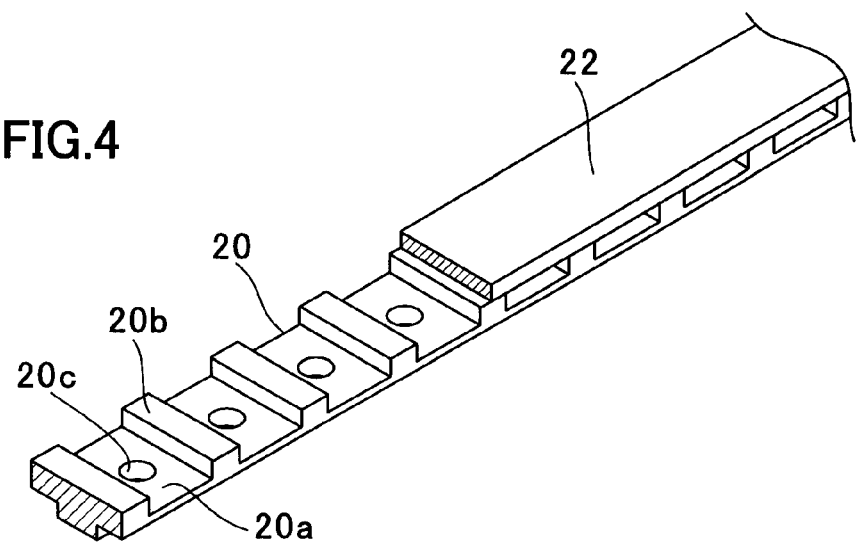
FIG. 4 is a perspective view showing a configuration of an air guide bar of the transfer apparatus according the first embodiment.
Figure 5:
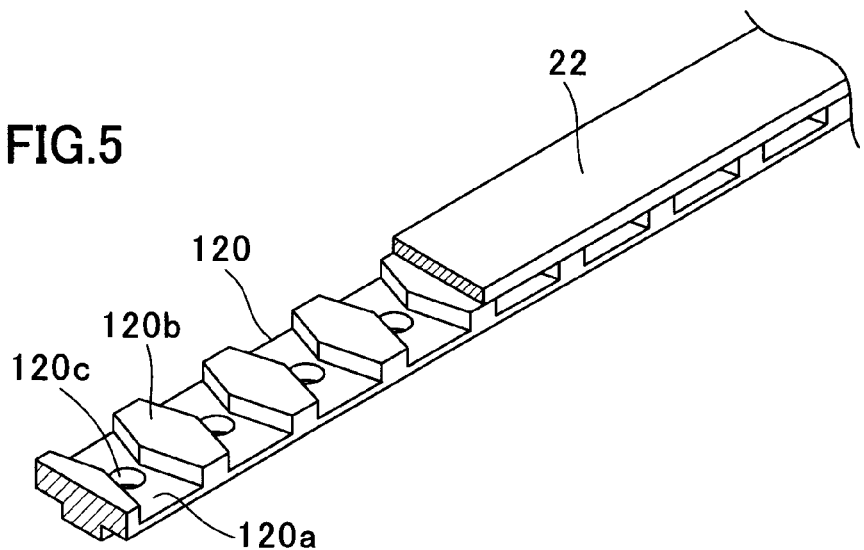
FIG. 5 is a perspective view showing a configuration of a first example of modification of the air guide bar.
Figure 6:
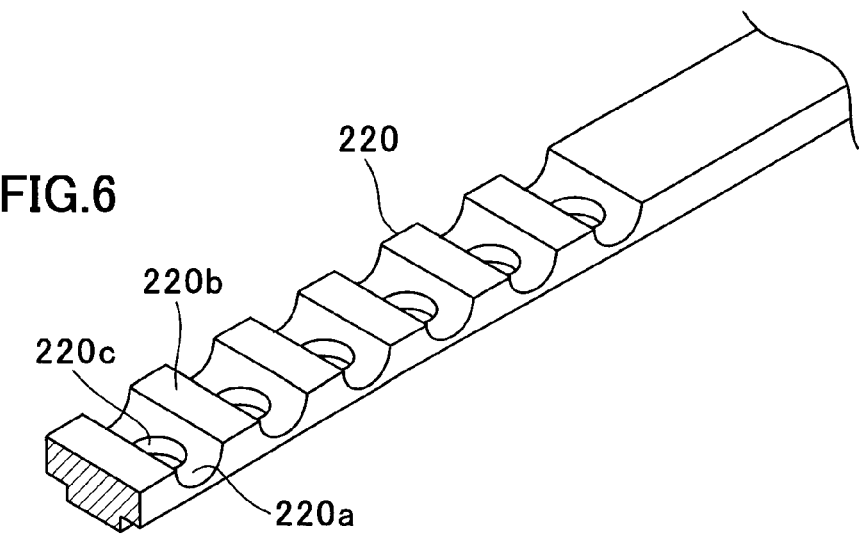
FIG. 6 is a perspective view showing a configuration of a second example of modification of the air guide bar.

With reference to FIGS. 4 to 6, a configuration of the air guide bar 20 of the transfer apparatus according to the first embodiment, and a configuration of an example of modification of the air guide bar, will be described below. FIG. 4 is a perspective view showing a configuration of the air guide bar of the transfer apparatus according the first embodiment. FIG. 5 is a perspective view showing a configuration of a first example of modification of the air guide bar, and FIG. 6 is a perspective view showing a configuration of a second example of modification of the air guide bar.

As shown in FIG. 4, in the air guide bar 20 in the first embodiment, each of the upper grooves (first paths) 20a and the upper cogs 20b is formed to linearly extend in the widthwise direction. Each of the upper grooves 20a is defined in a rectangular shape in side view and top plan view. A portion of the air guide bar 20 defining a bottom of each of the upper grooves 20a is formed in a flat shape, and each of the holes (second paths) 20c is formed in the flat portion.

As shown in FIG. 5, an air guide bar 120 as the first example of modification comprises a plurality of upper grooves (first paths) 120a, a plurality of upper cogs 120b and a plurality of holes (second paths) 120c. Each of the upper grooves (first paths) 120a is formed, in top plan view, in a shape which is defined by two straight lines extending obliquely from each of opposite widthwise edges to a central region thereof in such a manner that a width thereof in the transfer direction gradually narrows toward the central region. On the other hand, each of the upper cogs 120b is formed, in top plan view, in a shape which has a width in the transfer direction gradually widens toward a central region thereof. Each of the holes (second paths) 120c is formed in the air guide bar 120 approximately at a position corresponding to the central region of a corresponding one of the upper grooves 120a where the width thereof in the transfer direction becomes narrowest.

As shown in FIG. 6, an air guide bar 220 as the second example of modification comprises a plurality of upper grooves (first paths) 220a, a plurality of upper cogs 220b and a plurality of holes (second paths) 220c. Each of the upper grooves (first paths) 220a is formed in a rectangular shape in top plan view, and in a semicircular shape in a side view. Each of the upper cogs 120b is formed in a rectangular shape in top plan view, and in a shape in a side view which is defined by a flat top line and two inwardly-concaved arc-shaped skirt lines extending downwardly from respective opposite ends of the flat top line. Each of the holes (second paths) 220c is formed in the air guide bar 220 approximately at a position corresponding to a widthwise central region of a corresponding one of the upper grooves 220a.

A function and advantage of the transfer apparatus according to the first embodiment will be described below.

Based on the aforementioned structure, in response to activating the evacuator 16, an air in the interspace S between the bottom surface of the corrugated paperboard sheet D and the uppermost region of the outer peripheral surface of the conveyer belt 30 is evacuated through the evacuation box 12, the holes (evacuation passages) 8c of the belt support member 8, the holes (second paths) 20c of the air guide bar 20, the upper grooves (first paths) 20a of the air guide bar 20, the inner grooves 30a of the conveyer belt 30, and the vacuum suction holes 30c of the conveyer belt 30.

When the air in the interspace S is evacuated, a negative pressure is generated in the interspace S, and thereby the conveyer belt 30 is displaced upwardly and brought into contact with the corrugated paperboard sheet D. Further, a negative pressure is generated in the inner grooves 30a of the conveyer belt 30, and thereby the sealing belts 24 are displaced upwardly and brought into contact with the inner cogs 30b of the conveyer belt 30 to seal the inner cogs 30b. Thus, along with a movement of the conveyer belt 30 in the transfer direction, the corrugated paperboard sheet D, i.e., a sheet, is also moved in the transfer direction while being supported by the top plate 4.

The air guide bar 20, the holes (evacuation passages) 8c, the holes (evacuation passages) 12c and the evacuation box 12 are arranged around the widthwise intermediate portion of the belt support member 8, as mentioned above. Thus, an evacuation pathway can be obtained with a simple structure.

Furthermore, in the first embodiment, the following functions and advantages can be obtained. Firstly, an air in the interspace S between the conveyer belt 30 and the corrugated paperboard sheet D is evacuated from the vacuum suction holes 30s, and the conveyer belt 30 is displaced upwardly by a resulting vacuum suction force to transfer the corrugated paperboard sheet D while vacuum-sucking the corrugated paperboard sheet D. Thus, no frictional force acts between the conveyer belt 30 and the belt support member 8, and a load of the corrugated paperboard sheet D is not largely applied to the conveyer belt 30. This makes it possible to transfer a corrugated paperboard sheet with a smaller driving force than ever before.

Secondly, the plurality of inner grooves 30a formed to extend in the widthwise direction of the conveyer belt 30 and arranged side-by-side in the transfer direction are provided on the inner peripheral surface of the belt member 30. This makes it possible to allow an air in the interspace S between the conveyer belt 30 and the corrugated paperboard sheet D to be smoothly evacuated through the inner grooves 30a. In this case, the air is evacuated through the vacuum suction holes 30c formed correspondingly to the inner grooves 30a of the conveyer belt (timing belt) 30, the inner grooves 30a of the conveyer belt 30, and the evacuation passage 8c (communicating the evacuation mechanism (12, 16) and the respective vacuum suction holes 30c of the conveyer belt 30), so as to effectively obtain a vacuum suction force for holding the corrugated paperboard sheet D. Further, the timing belt 30 arranged to be engaged with the driving roll (see the reference numeral 306 in FIG. 13) can be moved in synchronization with driving of a motor (not shown) for the driving roll.

Thirdly, the sealing belts 24 are displaced upwardly together with the conveyer belt 30 to seal the inner grooves 30a of the conveyer belt 30, so as to prevent vacuum leakage (intrusion of air) to avoid decrease in vacuum suction force. Further, the vent holes 8d for allowing air to get into and out from between the belt support member 8 and each of the sealing belts 24 is formed in the belt support member 8. Thus, when the sealing belts 24 are displaced upwardly according to a vacuum suction force, no negative pressure is generated between the belt support member 8 and each of the sealing belts 24 to facilitate the upward displacement of the sealing belts 24. This makes it possible to more effectively maintain a higher vacuum suction force.

Fourthly, the air guide bar 20 disposed on the widthwise intermediate portion of the belt support member 8 has the second paths 20c each having the downwardly oriented lower open end communicated with a respective one of the evacuation passages 8c of the belt support member 8, and the first paths 20a each communicated with a corresponding one of the second paths 20c and formed to extend in the widthwise direction of the belt support member 8, and each of the first paths 20a is communicated with a respective at least one of the inner grooves 30a of the conveyer belt 30. Thus, an air in the interspace S between the conveyer belt 30 and the corrugated paperboard sheet D is more effectively evacuated through the vacuum suction holes 30c of the conveyer belt 30, the inner grooves 30a of the conveyer belt 30, the first paths 20a of the air guide bar 20, the second paths 20c of the air guide bar 20 and the evacuation passages 8c of the belt support member 8. Further, as compared with a structure designed to evacuate the air from respective sides of the two top plate assemblies of the top plate section 2, the air guide bar 20 disposed on the widthwise intermediate portion of the belt support member 8 makes it possible to reduce vacuum leakage to effectively obtain a desired vacuum suction force. In addition, a production cost can be reduced as compared with the structure designed to evacuate the air from the respective sides of the two top plate assemblies of the top plate section 2.

Fifthly, the outer peripheral surface of the conveyer belt 30 is formed in a flat shape capable of carrying the corrugated paperboard sheet D. This makes it possible to increase a contact area with the corrugated paperboard sheet D to more reliably transfer the corrugated paperboard sheet D.

Sixthly, the sealing belts 24 are disposed on respective opposite sides of the air guide bar 20. This makes it possible to satisfy both of effective evacuation based on the air guide bar 20 and maintenance of a high vacuum suction force based on the sealing belts 24 disposed on the respective opposite sides of the air guide bar 20.

Seventhly, the air guide bar 20 is mounted in the mount groove 8a formed in the widthwise intermediate portion of the belt support member 8 to extend in the transfer direction. Thus, a mounting position of the air guide bar 20 can be determined by the mount groove 8a. This makes it possible to more accurately communicate the air guide bar 20 with the evacuation passages 8c of the belt support member 8 and with the inner grooves 30a of the conveyer belt 30, with a low-cost structure.

Eighthly, the sealing plate 22 is provided between the air guide bar 22 and the conveyer belt 30 to seal the air guide bar 20, wherein the upper grooves 20a is formed in the air guide bar 20 to extend in the widthwise direction thereof and defining the first paths 20a in cooperation with the sealing plate 22. Thus, the first paths 20a can be defined by a simple structure comprising a combination of the upper grooves 20a of the air guide bar 20 and the sealing plate 22.

Ninthly, the conveyer belt 30 is formed as a single piece in the widthwise direction thereof and between the two top plate assemblies of the top plate section 2, wherein the recess 30d is formed in the bottom surface of the widthwise intermediate portion of the conveyer belt 30 to receive therein the sealing plate 22 and at least a part of the air guide bar 20. This makes it possible to obtain a transfer apparatus having an enhanced air-sealing capability.

Tenthly, each of the evacuation passages 8c of the belt support member 8 is formed as a through-hole penetrating through the belt support member 8 in the upward-downward direction, and the evacuation box 12 connected to the evacuator 16 is disposed beneath the evacuation passages 8c. This makes it possible to allow air to be efficiently evacuated using the evacuation passages 8c each penetrating through the belt support member 8 in the upward-downward direction, and the evacuation box disposed beneath the evacuation passages 8c.

Eleventhly, the vacuum suction holes 30c are formed only in the region extending from a first leading edge position T (see FIG. 3) to a position spaced apart from the first leading edge position T by the minimum length Lmin, without being formed in the region extending from the position spaced apart from the first leading edge position T by the minimum length Lmin, to a next leading edge position T (i.e., a position spaced apart from the first leading edge position T by the maximum length Lmax). This makes it possible to prevent air from being uselessly evacuated, for example, in an operation of transferring the shortest corrugated paperboard sheet D having the minimum length Lmin, because no vacuum suction hole is formed in a region of the conveyer belt 30 on which the corrugated paperboard sheet D is not placed (i.e., in the region extending from the position spaced apart from the leading edge position T by the minimum length Lmin, to the next leading edge position T). In addition, the longest corrugated paperboard sheet D having the maximum length Lmax can also be transferred using the vacuum suction holes 30c formed in the region extending by the minimum length Lmin.

Twelfthly, based on the vacuum suction holes 30c of the timing belt 30, the inner grooves 30a of the timing belt 30, the first and second paths 20a, 20b formed in the air guide bar 20 (mounted in the mount groove 8a formed on the top surface of the widthwise intermediate portion of the belt support member 8 to extend in the transfer direction) in such a manner as to be communicated with the respective inner grooves 30a, and the evacuation passages 8c of the belt support member 8 communicated with to the respective second paths 20c, a vacuum suction force for holding and transferring the corrugated paperboard sheet D can be obtained more reliably and effectively with a simple structure.

Thirteenthly, the sealing belts 24 are displaced upwardly together with the conveyer belt 30 to seal the inner grooves 30a of the conveyer belt 30, so as to prevent vacuum leakage (intrusion of air) to avoid decrease in vacuum suction force. Further, the vent holes 8d for allowing air to get into and out from between the belt support member 8 and each of the sealing belts 24 is formed in the belt support member 8. Thus, when the sealing belts are displaced upwardly according to a vacuum suction force, no negative pressure is generated between the belt support member 8 and each of the sealing belts 24 to facilitate the upward displacement of the sealing belts 24. This makes it possible to more effectively maintain a higher vacuum suction force.

Figure 7:
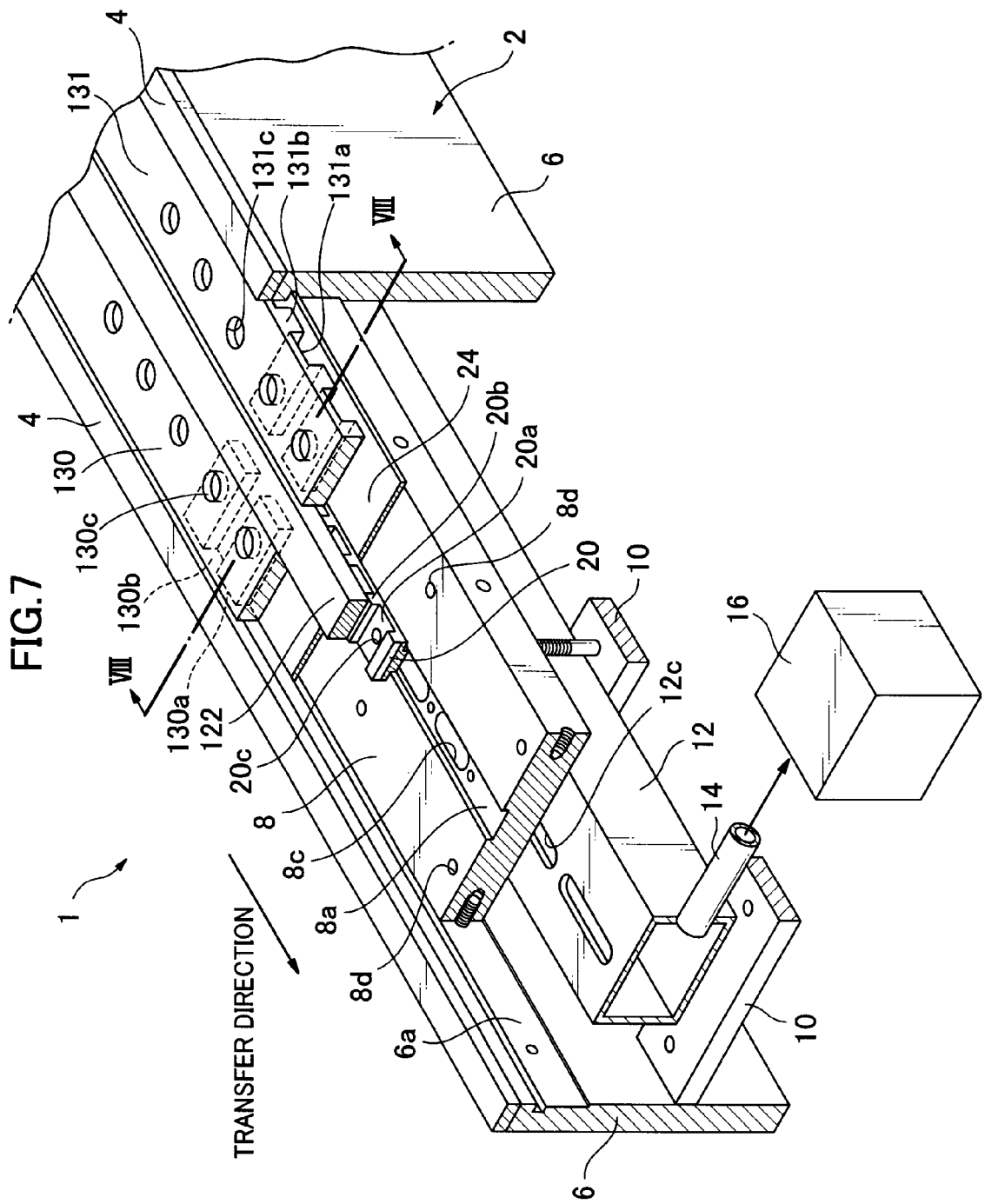
FIG. 7 is a fragmentary partially-broken perspective view showing a transfer apparatus according a second embodiment of the present invention.
Figure 8:
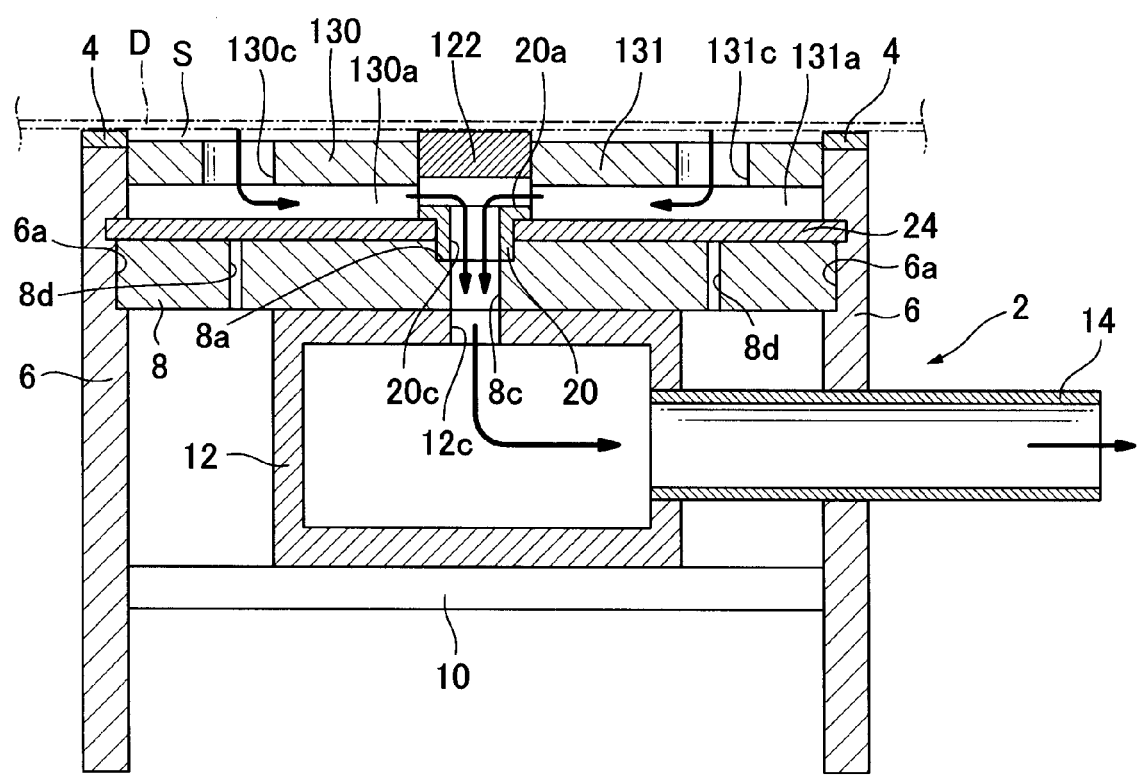
FIG. 8 is a sectional view showing the transfer apparatus according the second embodiment, taken along the line VIII-VIII in FIG. 7.

With reference to FIGS. 7 and 8, a structure of a transfer apparatus 1 according a second embodiment of the present invention will be described below. FIG. 7 is a fragmentary partially-broken perspective view showing the transfer apparatus according the second embodiment, and FIG. 8 is a sectional view showing the transfer apparatus according the second embodiment, taken along the line VIII-VIII in FIG. 7.

Except for a sealing plate 122 and a pair of first and second conveyer belts 130, 131, the remaining structure in the second embodiment is the same as that in the first embodiment. Therefore, the same element or component as that in the first embodiment is defined by a common reference numeral or code, and its detailed description will be omitted on a case-by-case basis.

The transfer apparatus 1 according to the second embodiment comprises a top plate section 2 (a pair of top plate bodies (top plate) 4 and a pair of top plate bases 6), and the top plate bases 6 are formed with a pair of inside grooves 6a which fittingly receive therein respective ones of opposite lateral edges of a plate-shaped belt support member 8 in such a manner as to allow the belt support member 8 to be fastened to each of the top plate bases 6 by fastening means, such as screws. An evacuation box 12 is fixed to the top plate bases 6 and further fixedly attached to the belt support member 8, and an evacuator 16 is connected to the evacuation box 12 through an evacuation pipe 14 to evacuate air in the evacuation box 12.

The belt support member 8 has a cross-sectionally rectangular-shaped mount groove 8a formed in a top surface of a widthwise intermediate portion thereof to extend in a transfer direction.

The belt support member 8 has a plurality of oval-shaped holes (evacuation passages) 8c each formed in a portion thereof defining a bottom of the mount groove 8a and at a position corresponding to a respective at least one of a plurality of holes 20c of an after-mentioned air guide bar 20. Each of the holes 8c is formed to penetrate through the belt support member 8 in an upward-downward direction, and the evacuation box 12 has a plurality of oval-shaped holes (evacuation passages) 12c formed in a top surface thereof at respective positions corresponding to the holes 8c of the belt support member 8.

The belt support member 8 also has a plurality of vent holes 8d each formed to penetrate therethrough in an upward-downward direction to have a lower open end communicated with ambient air. The vent holes 8d are provided as a means to allow ambient air to get into between the belt support member 8 and each of two sealing belts 24 when the sealing belts 24 are displaced upwardly together with the conveyer belt 30 according to a negative pressure, as will be described later, so as to prevent generation of a negative pressure therebetween to keep the upward displacement from being hindered.

The mount groove 8a of the belt support member 8 fittingly receives therein an air guide bar 20. The air guide bar 20 has a plurality of upper grooves 20a and a plurality of upper cogs 20b, each of which extends in a widthwise direction thereof, and a sealing plate 122 is provided on the air guide bar 20 in such a manner that a bottom surface of the sealing plate 22 closely contacts respective top edges of the upper cogs 20b. The two sealing belts 24 are disposed on respective opposite sides of the air guide bar 20 and inside the top plate section 2, and placed on a top surface of the belt support member 8 displaceably in an upward-downward direction.

The air guide bar 20 has the plurality of upper grooves 20a extending in the widthwise direction, as mentioned above, and a portion of the air guide bar 20 between the adjacent upper grooves 20a is formed with a hole (path) 20c penetrating through the air guide bar 20 in an upward-downward direction. Each of the upper grooves 20a is formed and arranged to be communicated with a respective at least one of a plurality of first inner grooves 130a of an after-mentioned first conveyer belt 130 and with a respective at least one of a plurality of second inner grooves 131a of an after-mentioned second conveyer belt 131, so that air evacuated from a plurality of first vacuum suction holes 130c of the after-mentioned first conveyer belt 130 and a plurality of second vacuum suction holes 131c of the after-mentioned second conveyer belt 131 is led into the upper grooves 20a of the air guide bar 20 via the respective first and second inner grooves 130a, 131a of the after-mentioned first and second conveyer belts 130, 131.

The sealing plate 122 is formed and arranged to seal the upper grooves 20a of the air guide bar 20, so that a plurality of first paths extending in the widthwise direction of the belt support member 8 are defined by the upper grooves 20a and the sealing plate 122. Each of the holes 20c of the air guide bar 20 is formed as a second path which has an upper open end communicated with a corresponding one of the first paths, and extends downwardly to have a lower open end oriented downwardly and communicated with a respective one of the holes (evacuation passages) 8c of the belt support member 8. Thus, as shown in FIG. 8, each of the upper groves 20a, i.e., first paths, is communicated with a respective at least one of the first inner grooves 130a of the after-mentioned first conveyer belt 130 and a respective at least one of the second inner grooves 131a of the after-mentioned second conveyer belt 131, and communicated with the corresponding one of the holes (second paths) 20c, to allow the air from the first and second vacuum suction holes 130c, 131c to be evacuated through the first and second inner grooves 130a, 131a, the upper grooves 20a and the holes 20c.

A pair of first and second conveyer belts 130, 131 are disposed on respective top surfaces of the sealing belts 24 and on respective opposite sides of the sealing plate 122. As shown in FIG. 7, the first conveyer belt 130 has an inner peripheral surface which is provided with a plurality of first inner grooves 130a each defined to extend in a width direction thereof and arranged side-by-side in the transfer direction, and a plurality of first inner cogs 130b formed and arranged to define the first inner grooves 130a between adjacent ones thereof, and the second conveyer belt 131 has an inner peripheral surface which is provided with a plurality of second inner grooves 131a each defined to extend in a width direction thereof and arranged side-by-side in the transfer direction, and a plurality of second inner cogs 131b formed and arranged to define the second inner grooves 131a between adjacent ones thereof.

Each of the first and second conveyer belts 130, 131 is adapted to be circulatingly moved in the transfer direction in such a manner that the inner cogs (130b, 131b) are sequentially engaged with a driving roll (see the reference numeral 306 in FIG. 13) and upstream and downstream driven rolls (see the reference numeral 302 in FIG. 13). That is, each of the first and second conveyer belts 130, 131 functions as a timing belt.

As shown in FIGS. 7 and 8, the first conveyer belt 130 is formed with a plurality of first vacuum suction holes 130c for evacuating air, and the second conveyer belt 131 is formed with a plurality of second vacuum suction holes 131c for evacuating air. The first vacuum suction holes 130c are formed correspondingly to the respective first inner grooves 130a defined on the inner peripheral surface of the first conveyer belt 130, and the second vacuum suction holes 131c) are formed correspondingly to the respective second inner grooves 131a) defined on the inner peripheral surface of the second conveyer belt 131. Thus, air evacuated from the first and second vacuum suction holes 130c, 131c is firstly led into the first and second inner grooves 130a, 131b.

The sealing belts 24 are adapted to be circulatingly moved in the transfer direction together with the conveyer belts 130, 131, and the sealing plate 122 and the air guide bar 20 are mounted to the belt support member 8 without causing any relative displacement relative to the belt support member 8.

As shown in FIG. 8, the first and second conveyer belts 130, 131 are disposed on respective opposite sides of the sealing plate 122. Each of the first and second conveyer belts 130, 131 is formed and arranged such that opposite lateral edges thereof are sealed by the sealing plate 122 and the top plate section 2, respectively.

As shown in FIG. 8, the sealing plate 122 is formed and arranged such that a top surface thereof is located at a height position approximately equal to that of the top plate 4. FIG. 8 shows each of the first and second conveyer belts 130, 131 in a state when it is not displaced upwardly by a vacuum suction force, wherein the top surface of each of the sealing plate 122 and the top plate 4 is located at a height position slightly higher than that of an uppermost region of an outer peripheral surface of each of the first and second conveyer belts 130, 131. Then, when each of the first and second conveyer belts 130, 131 is displaced upwardly by a vacuum suction force, the height position of the uppermost region of the outer peripheral surface of each of the first and second conveyer belts 130, 131 will become approximately equal to that of the top surface of each of the sealing plate 122 and the top plate 4.

As shown in FIG. 8, the top surface of the top plate 4 is set at a height position higher than the uppermost region of the outer peripheral surface of each of the first and second conveyer belts 130, 131. Specifically, the outer peripheral surface of each of the first and second conveyer belts 130, 131 is formed in a flat shape, and the uppermost region of the outer peripheral surface of each of the first and second conveyer belts 130, 131 is disposed at a height position slightly lower than that of the top surface of the top plate 4. For example, although a desired difference between the height positions varies depending on a width of the conveyer belt, it may be set in the range of about 0.1 to 1 mm, preferably in the range of 0.1 to 0.5 mm. Thus, an interspace S is defined between a bottom surface of a corrugated paperboard sheet D placed on the top plate 4 and the uppermost region of the outer peripheral surface of each of the first and second conveyer belts 130, 131. The corrugated paperboard sheet D, i.e., a sheet, is primarily supported by the top surface of the top plate 4.

A function and advantage of the transfer apparatus according to the second embodiment will be described below.

As for the same structure as that in the first embodiment, the transfer apparatus according to the second embodiment has the same functions and advantages as those in the first embodiment. Therefore, their description will be omitted herein (refer to the functions and advantages in the first embodiment).

Based on the above structure, in the second embodiment, in response to activating the evacuator 16, an air in the interspace S between the bottom surface of the corrugated paperboard sheet D and the respective uppermost regions of the outer peripheral surfaces of the first and second conveyer belts 130, 131 is evacuated through the evacuation box 12, the holes (evacuation passages) 8c of the belt support member 8, the holes (second paths) 20c of the air guide bar 20, the upper grooves (first paths) 20a of the air guide bar 20, the first and second inner grooves 130a, 131a of the first and second conveyer belts 130, 131, and the first and second vacuum suction holes 130c, 131c of the first and second conveyer belts 130, 131, as indicated by the arrowed lines in FIG. 8.

When the air in the interspace S is evacuated, a negative pressure is generated in the interspace S, and thereby the first and second conveyer belts 130, 131 are displaced upwardly and brought into contact with the corrugated paperboard sheet D. Further, a negative pressure is generated in the first and second inner grooves 130a, 131a of the first and second conveyer belts 130, 131, and thereby the sealing belts 24 are displaced upwardly and brought into contact with the first and second inner cogs 130b, 131b of the first and second conveyer belts 130, 131 to seal the first and second inner cogs 130b, 131b. Thus, along with a movement of the first and second conveyer belts 130, 131 in the transfer direction, the corrugated paperboard sheet D, i.e., a sheet, is also moved in the transfer direction while being supported by the top plate 4 and the sealing plate 122.

Differently from the first embodiment, in the second embodiment, the first and second conveyer belts 130, 131 are disposed on the respective opposite sides of the sealing plate 122, and the sealing plate 122 itself is formed to have a larger thickness. Further, the first and second conveyer belts 130, 131 are disposed at approximately the same height position, and the opposite lateral edges of each of the first and second conveyer belts 130, 131 are sealed by the sealing plate 122 and the top plate section 2, respectively.

Thus, the corrugated paperboard sheet D can be more reliably supported and transferred, using the first and second conveyer belts 130, 131 disposed at approximately the same height position. In addition, even if the two separated conveyer belts 130, 131 are used, a vacuum suction force can be reliably maintained based on the structure where opposite lateral edges of each of the first and second conveyer belts 130, 131 are sealed by the sealing plate 122 and the top plate section 2, respectively.

Figure 9:
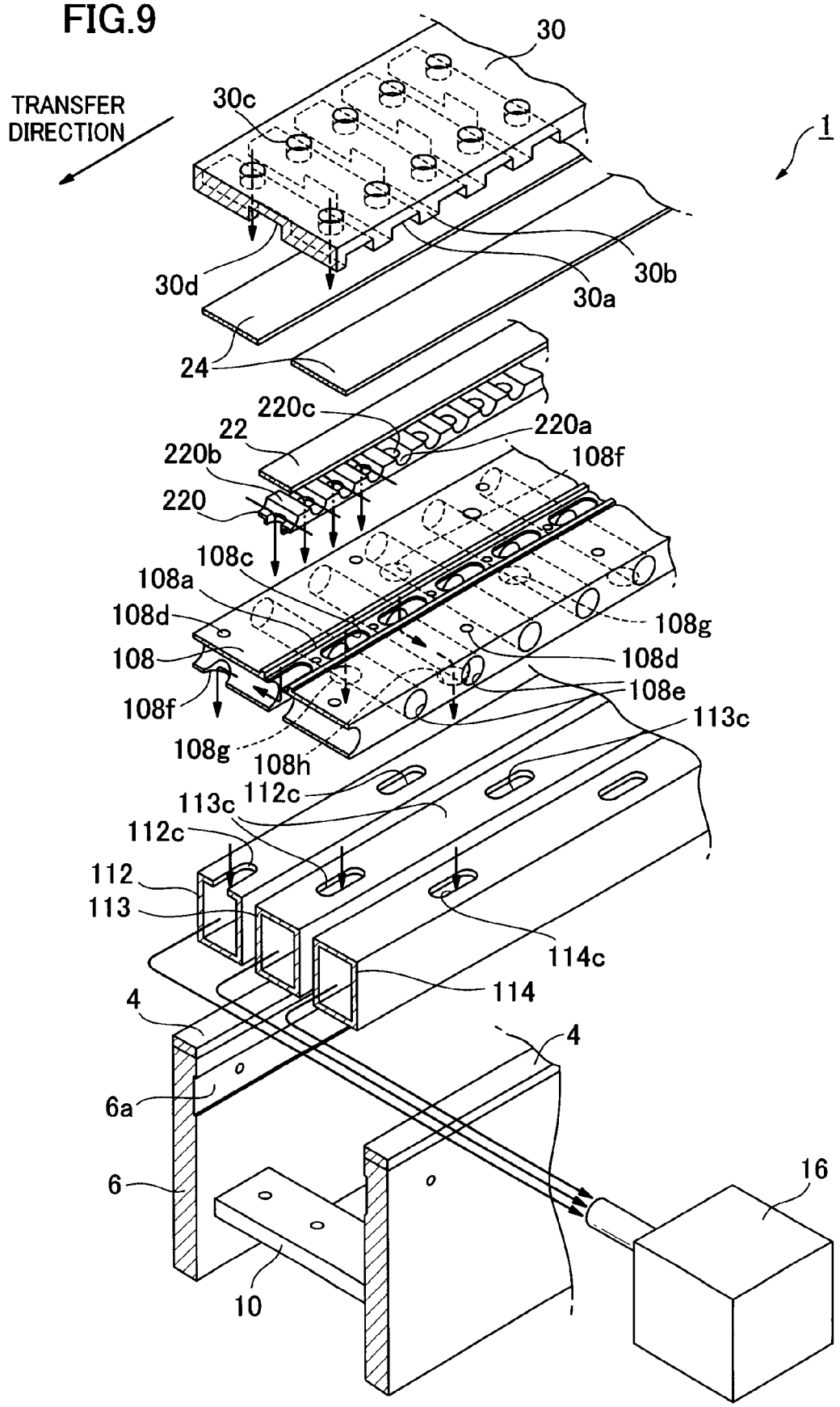
FIG. 9 is an exploded perspective view showing components of a transfer apparatus according a third embodiment of the present invention.
Figure 10:
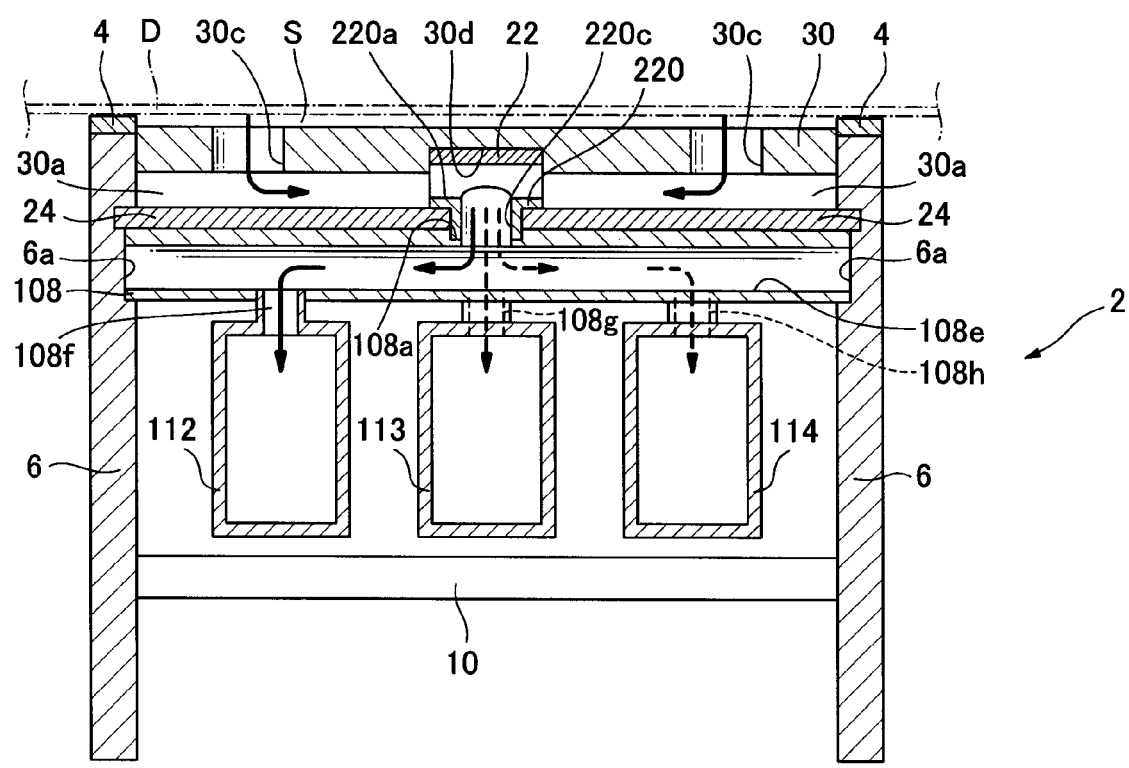
FIG. 10 is a sectional view showing the transfer apparatus according the third embodiment.

With reference to FIGS. 9 and 10, a structure of a transfer apparatus 1 according a third embodiment of the present invention will be described below. FIG. 9 is an exploded perspective view showing components of the transfer apparatus according the third embodiment, and FIG. 10 is a sectional view showing the transfer apparatus according the third embodiment.

Except for a belt support member 108, an air guide bar 220 and first to third evacuation boxes 112, 113, 114, the remaining structure in the third embodiment is the same as that in the first embodiment. Therefore, the same element or component as that in the first embodiment is defined by a common reference numeral or code, and its detailed description will be omitted on a case-by-case basis.

The transfer apparatus 1 according to the third embodiment comprises a top plate section 2 (a pair of top plate bodies (top plate) 4 and a pair of top plate bases 6), and the top plate bases 6 are formed with a pair of inside grooves 6a which fittingly receive therein respective ones of opposite lateral edges of a belt support member 108 in such a manner as to allow the belt support member 108 to be fastened to each of the top plate bases 6 by fastening means, such as screws.

First, second and third evacuation boxes 112, 113, 114 are fixedly attached to a bottom surface of the belt support member 108, and an evacuator 16 is connected to each of the first to third evacuation boxes 112, 113, 114 to evacuate air in each of the first to third evacuation boxes 112, 113, 114.

The belt support member 108 has a cross-sectionally rectangular-shaped mount groove 108a formed in a top surface of a widthwise intermediate portion thereof to extend in a transfer direction. The belt support member 8 also has a plurality of oval-shaped upper holes (evacuation passages) 108c each formed in a portion thereof defining a bottom of the mount groove 108a and at a position corresponding to a respective at least one of a plurality of holes 220c of an after-mentioned air guide bar 220. Further, the belt support member 108 has a plurality of cross-sectionally circular-shaped cave holes (horizontal holes; evacuation passages) 108e formed to penetrate through the belt support member 108 in a widthwise direction thereof, at positions beneath the respective upper holes 108c, and opposite lateral open ends of each of the cave holes 108c are sealed by the top plate section 2.

Further, the belt support member 108 has a plurality of first lower holes (evacuation passages) 108f, a plurality of second lower holes (evacuation passages) 108g, and a plurality of third lower holes (evacuation passages) 108h, and each of the cave holes 108c is communicated with either one of upper open ends of the first, second and third lower holes 108f, 108g, 108h. In front view (when viewed from an upstream (a downstream?) side in the transfer direction), the first, second and third lower holes 108f, 108g, 108h are formed at a position adjacent to the left top plate base 6, an intermediate position between the right and left top plate bases 6 and a position adjacent to the right top plate base 6, respectively.

The first evacuation box 112 has a plurality of first holes (evacuation holes) 112c formed in a top surface thereof at positions corresponding to respective lower open ends of the first lower holes 108f. The second evacuation box 113 has a plurality of second holes (evacuation holes) 113c formed in a top surface thereof at positions corresponding to respective lower open ends of the second lower holes 108g, and the third evacuation box 114 has a plurality of third holes (evacuation holes) 114c formed in a top surface thereof at positions corresponding to respective lower open ends of the first lower holes 108h.

Further, the belt support member 108 has a plurality of vent holes 108d each formed to penetrate therethrough in an upward-downward direction to have a lower open end communicated with ambient air. The vent holes 108d are provided as a means to allow ambient air to get into between the belt support member 108 and each of two sealing belts 24 when the sealing belts 24 are displaced upwardly together with a conveyer belt 30 according to a negative pressure, as will be described later, so as to prevent generation of a negative pressure therebetween to keep the upward displacement from being hindered.

The mount groove 108a of the belt support member 108 fittingly receives therein an air guide bar 220. The air guide bar 220 has the same structure as that illustrated in FIG. 6. That is, the air guide bar 220 has a plurality of upper grooves 220a and a plurality of upper cogs 220b, each of which extends in a widthwise direction thereof, and a sealing plate 22 is provided on the air guide bar 220 in such a manner that a bottom surface of the sealing plate 22 closely contacts respective top edges of the upper cogs 220b. The sealing plate 22 is received in a recess 30d formed in a bottom surface of a conveyer belt 30. The two sealing belts 24 are disposed on respective opposite sides of the air guide bar 220 and inside the top plate section 2, and placed on a top surface of the belt support member 8 displaceably in an upward-downward direction.

The air guide bar 220 has the plurality of upper grooves 220a extending in the widthwise direction, as mentioned above, and a portion of the air guide bar 220 between the adjacent upper grooves 220a is formed with a hole (path) 220c penetrating through the air guide bar 220 in an upward-downward direction. Each of the upper grooves 220a is formed and arranged to be communicated with a respective at least one of a plurality of inner grooves 30a of the conveyer belt 30, so that air evacuated from a plurality of vacuum suction holes 30c of the conveyer belt 30 is led into the upper grooves 20a of the air guide bar 20 via the respective inner grooves 30a of the conveyer belt 30. Then, the air led into the upper grooves 220a and the holes 220c of the air guide bar 220 is sucked into the first to third evacuation boxes 112, 113, 114 via the first to third holes 108f, 108g, 108h and the first to third holes 112c, 113c, 114c.

The sealing plate 22 provided between the conveyer belt 30 and the upper grooves 220a of the air guide bar 20 is formed to seal the upper grooves 220a of the air guide bar 220, so that a plurality of first paths extending in the widthwise direction of the belt support member 108 to allow air to pass therethrough are defined by the upper grooves 220a and the sealing plate 22. Each of the holes 220c of the air guide bar 220 is formed as a second path which has an upper open end communicated with a corresponding one of the first paths, and extends downwardly to have a lower open end oriented downwardly and communicated with a respective one of the holes (evacuation passages) 108c. Thus, as shown in FIG. 10, each of the upper groves 220a, i.e., first paths, is communicated with a respective at least one of the inner grooves 30a of the conveyer belt 30 and the corresponding one of the holes (second paths) 220c, to allow the air from the vacuum suction holes 30c to be evacuated through the inner grooves 30a, the upper grooves 220a and the holes 220c.

The conveyer belt 30 is disposed on respective top surfaces of the sealing plate 22 and the sealing belts 24. As shown in FIG. 10, the conveyer belt 30 has an inner peripheral surface which is provided with the plurality of inner grooves 30a each defined to extend in a width direction thereof and arranged side-by-side in the transfer direction, and a plurality of inner cogs 30b formed and arranged to define the inner grooves 30a between adjacent ones thereof.

The conveyer belt 30 is adapted to be circulatingly moved in the transfer direction in such a manner that the inner cogs 30b are sequentially engaged with a driving roll (see the reference numeral 306 in FIG. 13) and upstream and downstream driven rolls (see the reference numeral 302 in FIG. 13). That is, the conveyer belt 30 functions as a timing belt.

As shown in FIGS. 9 and 10, the vacuum suction holes 30c are formed in the conveyer belt 30 correspondingly to the respective inner grooves 30a defined on the inner peripheral surface of the conveyer belt 30. Thus, air evacuated from the vacuum suction holes 30c is firstly led into the inner grooves 30a.

The sealing belts 24 are adapted to be circulatingly moved in the transfer direction together with the conveyer belt 30, and the sealing plate 22 and the air guide bar 220 are mounted to the belt support member 108 without causing any relative displacement relative to the belt support member 108.

As shown in FIG. 10, the top plate 4 is formed and arranged such that a top surface thereof is located at a height position higher than an uppermost region of an outer peripheral surface of the conveyer belt 30. Specifically, the outer peripheral surface of the conveyer belt 30 is formed in a flat shape, and the conveyer belt 30 is arranged such that the uppermost region of the outer peripheral surface thereof is located at a height position slightly lower than that of the top surface of the top plate 4. For example, although a desired difference between the height positions varies depending on a width of the conveyer belt, it may be set in the range of about 0.1 to 1 mm, preferably in the range of 0.1 to 0.5 mm. Thus, an interspace S is defined between a bottom surface of a corrugated paperboard sheet D placed on the top plate 4 and the uppermost region of the outer peripheral surface of the conveyer belt 30. The corrugated paperboard sheet D, i.e., a sheet, is primarily supported by the top surface of the top plate 4.

A function and advantage of the transfer apparatus according to the third embodiment will be described below.

As for the same structure as that in the first embodiment, the transfer apparatus according to the third embodiment has the same functions and advantages as those in the first embodiment. Therefore, their description will be omitted herein (refer to the functions and advantages in the first embodiment).

Based on the above structure, in the third embodiment, in response to activating the evacuator 16, an air in the interspace S between the bottom surface of the corrugated paperboard sheet D and the uppermost region of the outer peripheral surface of the conveyer belt 30 is evacuated through the first to third evacuation boxes 112, 113, 114, the first to third lower holes 108f, 108g, 108h of the belt support member 108, the cave holes 108e of the belt support member 108, the upper holes 108c of the belt support member 108, the holes (second paths) 220c of the air guide bar 220, the upper grooves (first paths) 220a of the air guide bar 220, the inner grooves 30a of the conveyer belt 30, and the vacuum suction holes 30c of the conveyer belt 30, as indicated by the arrowed lines in FIGS. 9 and 10.

When the air in the interspace S is evacuated, a negative pressure is generated in the interspace S, and thereby the conveyer belt 30 is displaced upwardly and brought into contact with the corrugated paperboard sheet D. Further, a negative pressure is generated in the inner grooves 30a of the conveyer belt 30, and thereby the sealing belts 24 are displaced upwardly and brought into contact with the inner cogs 30b of the conveyer belt 30 to seal the inner cogs 30b. Thus, along with a movement of the conveyer belt 30 in the transfer direction, the corrugated paperboard sheet D, i.e., a sheet, is also moved in the transfer direction while being supported by the top plate 4.

In the third embodiment, the belt support member 108 has the upper holes (first evacuation passages) 108c each having an upper open end at the top surface thereof to extend downwardly, the cave holes (second evacuation passages) 108e each communicated with of a lower open end of a corresponding one of the upper holes 108c and formed to extend in a widthwise direction of the support plate 108, and first to third lower holes (third evacuation passages) 108f, 108g, 108h each having an upper open end communicated with a corresponding one of the cave hole 108e and formed to have a lower open end at the bottom surface thereof.

The first to third lower holes 108f, 108g, 108h are formed to be communicated with the respective cave holes 108e at different positions in the widthwise direction, and the first, second and third evacuation boxes 112, 113, 114 are communicated with the group of first lower holes 108f, the group of second lower holes 108g and the group of third lower holes 108h, respectively. Thus, a relatively large vacuum suction force can be obtained using all the first to third evacuation boxes 112, 113, 114.

Further, the first to third evacuation boxes 112, 113, 114 can be activated individually to adjust a vacuum suction force or change a position providing a vacuum suction force in the uppermost region of the outer peripheral surface of the conveyer belt 30.

Figure 11:
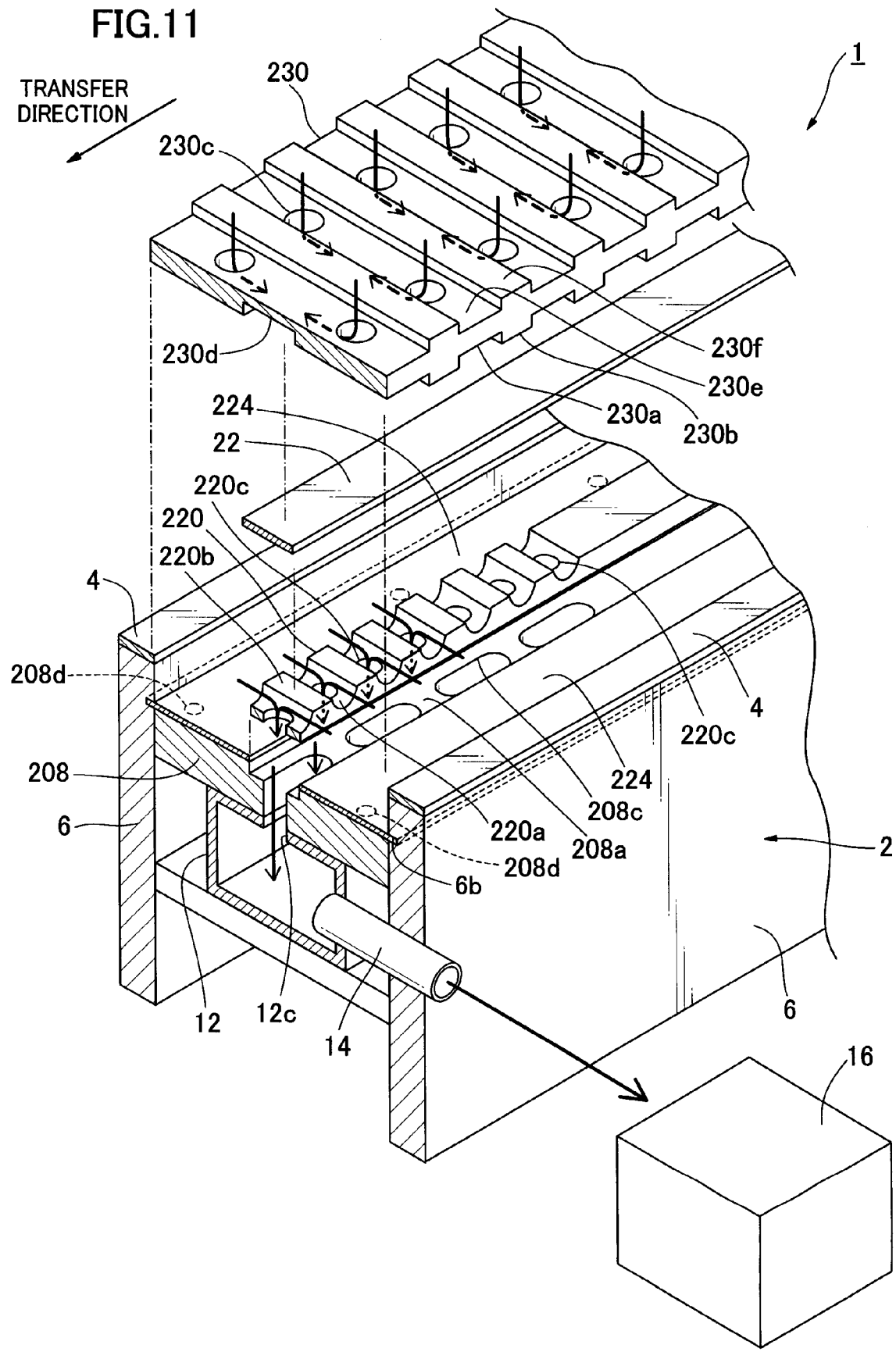
FIG. 11 is a fragmentary partially-broken perspective view showing a transfer apparatus according a fourth embodiment of the present invention.
Figure 12:
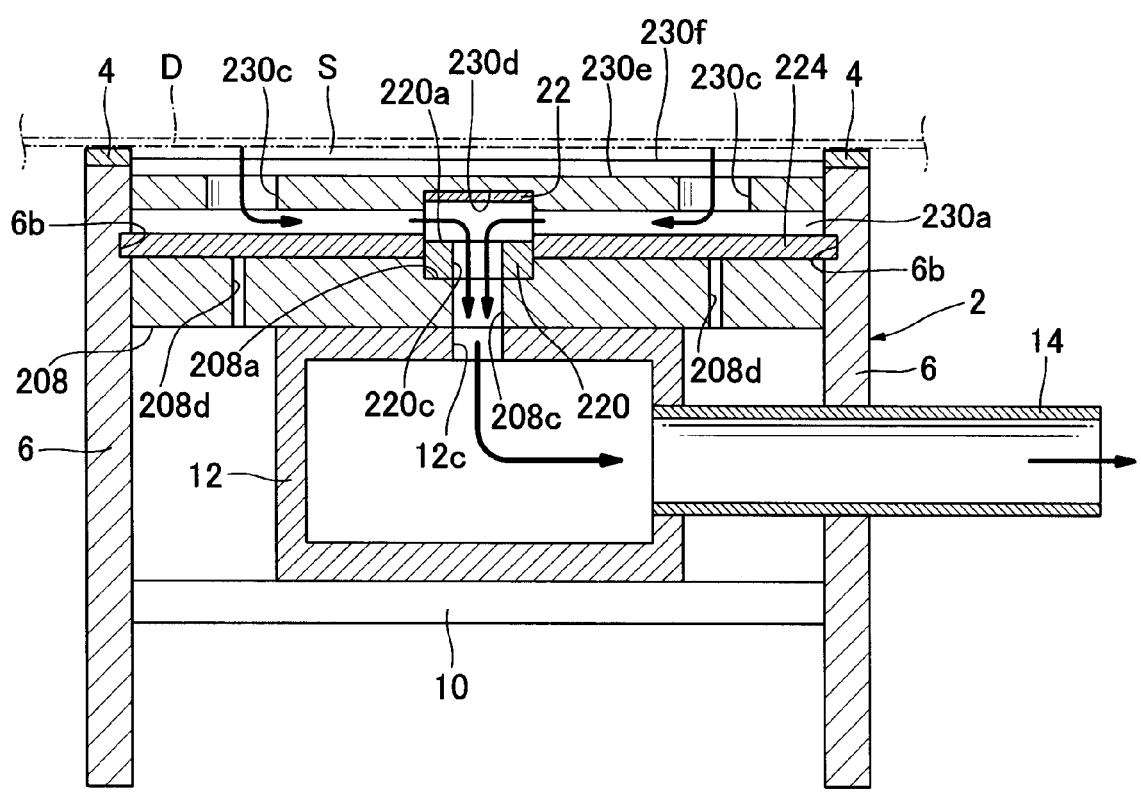
FIG. 12 is a sectional view showing the transfer apparatus according the fourth embodiment.

With reference to FIGS. 11 and 12, a structure of a transfer apparatus 1 according to a fourth embodiment of the present invention will be described below. FIG. 11 is a fragmentary partially-broken perspective view showing the transfer apparatus according the fourth embodiment, and FIG. 12 is a sectional view showing the transfer apparatus according the fourth embodiment.

Except for a belt support member 208, an air guide bar 220, sealing belts 224 and a conveyer belt 230, the remaining structure in the fourth embodiment is the same as that in the first embodiment. Therefore, the same element or component as that in the first embodiment is defined by a common reference numeral or code, and its detailed description will be omitted on a case-by-case basis.

The transfer apparatus 1 according to the fourth embodiment comprises a top plate section 2 (a pair of top plate bodies (top plate) 4 and a pair of top plate bases 6), a belt support member 208 fixed to respective opposed inside surfaces of the top plate bases 6, an evacuation box 12 fixed to the top plate bases 6 and fixedly attached to a bottom surface of the belt support member 208, and an evacuator 16 connected to the evacuation box 12 through an evacuation pipe 14 to evacuate air in the evacuation box 12.

The belt support member 208 has a cross-sectionally rectangular-shaped mount groove 208a formed in a top surface of a widthwise intermediate portion thereof to extend in a transfer direction. The belt support member 208 also has a plurality of oval-shaped holes (evacuation passages) 208c each formed in a portion thereof defining a bottom of the mount groove 208a and at a position corresponding to a respective at least one of a plurality of holes 220c of an after-mentioned air guide bar 220. Each of the holes 208c is formed to penetrate through the belt support member 208 in an upward-downward direction, and the evacuation box 12 has a plurality of oval-shaped holes (evacuation passages) 12c formed in a top surface thereof at respective positions corresponding to the holes 208c of the belt support member 208.

The belt support member 208 also has a plurality of vent holes 208d each formed to penetrate therethrough in an upward-downward direction to have a lower open end communicated with ambient air. The vent holes 208d are provided as a means to allow ambient air to get into between the belt support member 208 and each of two sealing belts 224 when the sealing belts 224 are displaced upwardly together with a conveyer belt 230 according to a negative pressure, as will be described later, so as to prevent generation of a negative pressure therebetween to keep the upward displacement from being hindered. Each of the inside surfaces of the top surface bases 6 is formed with an elongate groove 6b having a thickness approximately equal to that of a respective one of the sealing belts 224 and extending in the transfer direction, and an outer one of opposite lateral edges of the sealing belt 224 is received in the elongate groove 6b.

An air guide bar 220 has a plurality of upper grooves 220a extending in a widthwise direction thereof, and a portion of the air guide bar 220 between the adjacent upper grooves 220a is formed with a hole (path) 220c penetrating through the air guide bar 220 in an upward-downward direction. A sealing plate 22 is provided between the conveyer belt 230 and the upper grooves 220a of the air guide bar 220, and formed to seal the upper grooves 220a of the air guide bar 220, so that a plurality of first paths extending in the widthwise direction of the belt support member 208 to allow air to pass therethrough are defined by the upper grooves 220a and the sealing plate 22. Each of the holes 220c of the air guide bar 220 is formed as a second path which has an upper open end communicated with a corresponding one of the first paths, and extends downwardly to have a lower open end oriented downwardly and communicated with a respective one of a plurality of after-mentioned holes (evacuation passages) 208c. Thus, as shown in FIGS. 11 and 12, each of the upper grooves 20a, i.e., first paths, is communicated with a respective at least one of a plurality of inner grooves 230a formed on an inner peripheral surface of the conveyer belt 230 and the corresponding one of the holes (second paths) 220c, to allow the air from a plurality of vacuum suction holes 230c formed in the conveyer belt 230 to be evacuated through the inner grooves 230a, the upper grooves 220a and the holes 220c.

The conveyer belt 230 is disposed on respective top surfaces of the sealing plate 22 and the sealing belts 224. As shown in FIG. 11, the conveyer belt 30 has an inner peripheral surface which is provided with the plurality of inner grooves 230a each defined to extend in a width direction thereof and arranged side-by-side in the transfer direction, and a plurality of inner cogs 230b formed and arranged to define the inner grooves 230a between adjacent ones thereof.

The conveyer belt 230 is adapted to be circulatingly moved in the transfer direction in such a manner that the inner cogs 230b are sequentially engaged with a driving roll (see the reference numeral 306 in FIG. 13) and upstream and downstream driven rolls (see the reference numeral 302 in FIG. 13). That is, the conveyer belt 230 functions as a timing belt.

Further, the conveyer belt 230 has an outer peripheral surface which is provided with a plurality of outer grooves 230e formed to extend in the widthwise direction and arranged side-by-side in the transfer direction, and a plurality of outer cogs 230f formed and arranged to define the outer grooves 230e between adjacent ones thereof.

Each of the upper grooves 220a is formed to be communicated with a respective at least one of the inner grooves 230a of the conveyer belt 230, and each of the inner grooves 230a is communicated with a respective one of the outer grooves 230e through a respective at least one of the vacuum suction holes 230c. Thus, an air evacuated from the outer grooves 230e and through the vacuum suction holes 230c is led into the upper grooves 220a of the air guide bar 220 via the inner grooves 230a of the conveyer belt 230. Then, the air led into the upper grooves 220a and the holes 220c of the air guide bars 220 is sucked into the evacuation box 12 via the holes 208c and the holes 12c.

As shown in FIGS. 11 and 12, the plurality of vacuum suction holes 230c are formed in the conveyer belt 230 to evacuate air therethrough. Each of the vacuum suction holes 230c is formed in a portion of the conveyer belt 230 defining a combination of the inner groove 230a and the outer groove 230e communicated with each other. Thus, air in the outer grooves 230e is firstly sucked into the evacuation box 12 via the vacuum suction holes 230 and the inner grooves 230a.

The sealing belts 224 are adapted to be circulatingly moved in the transfer direction together with the conveyer belt 230, and the sealing plate 22 and the air guide bar 220 are mounted to the belt support member 208 without causing any relative displacement relative to the belt support member 208.

As shown in FIG. 12, the top surface of the top plate 4 is set at a height position higher than an uppermost region of the outer peripheral surface of the conveyer belt 230. Specifically, the outer peripheral surface of the conveyer belt 230 is formed in a flat shape, and the uppermost region of the outer peripheral surface of the conveyer belt 230 is disposed at a height position slightly lower than that of the top surface of the top plate 4. For example, although a desired difference between the height positions varies depending on a width of the conveyer belt, it may be set in the range of about 0.1 to 1 mm, preferably in the range of 0.1 to 0.5 mm. Thus, an interspace S is defined between a bottom surface of a corrugated paperboard sheet D placed on the top plate 4 and the uppermost region of the outer peripheral surface (i.e., the outer cogs 230f and the outer grooves 230e) of the conveyer belt 230. The corrugated paperboard sheet D, i.e., a sheet, is primarily supported by the top surface of the top plate 4.

The conveyer belt 230 having the combination of the inner grooves 230a and the outer grooves 230e in the fourth embodiment may be applied to each of the first to third embodiment.

A function and advantage of the transfer apparatus according to the fourth embodiment will be described below.

As for the same structure as that in the first embodiment, the transfer apparatus according to the fourth embodiment has the same functions and advantages as those in connection with the first embodiment. Therefore, their description will be omitted herein (refer to the functions and advantages in the first embodiment).

Based on the above structure, in the fourth embodiment, in response to activating the evacuator 16, an air in the interspace S between the bottom surface of the corrugated paperboard sheet D and the uppermost region of the outer peripheral surface of the conveyer belt 230 is evacuated through the evacuation box 12, the holes 208c of the belt support member 208, the holes (second paths) 220c of the air guide bar 220, the upper grooves (first paths) 220a of the air guide bar 220, the inner grooves 230a of the conveyer belt 230, the vacuum suction holes 230c of the conveyer belt 230 and the outer grooves 230e of the conveyer belt 230, as indicated by the arrowed lines in FIGS. 11 and 12.

When the air in the interspace S is evacuated, a negative pressure is generated in the interspace S. Thereby the conveyer belt 230 is displaced upwardly, and the outer cogs 230f of the conveyer belt 230 are brought into contact with the corrugated paperboard sheet D. Further, a negative pressure is generated in the inner grooves 230a of the conveyer belt 30, and thereby the sealing belts 24 are displaced upwardly and brought into contact with the inner cogs 230b of the conveyer belt 30 to seal the inner cogs 230b. Thus, along with a movement of the conveyer belt 230 in the transfer direction, the corrugated paperboard sheet D, i.e., a sheet, is also moved in the transfer direction while being supported by the top plate 4.

In the fourth embodiment, the top plate section 2 (top plate bodies 6) is formed with the pair of elongate grooves 6b each having a thickness approximately equal to that of a respective one of the sealing belts 224 and extending in the transfer direction, and each of the sealing belts 224 is received in a corresponding one of the elongate grooves 6b. This makes it possible to effectively prevent vacuum leakage from the sealing belts 224.

In the fourth embodiment, the conveyer belt 230 has the outer peripheral surface which is provided with the outer cogs 230f formed to extend in the widthwise direction and arranged side-by-side in the transfer direction, and the outer grooves 230e defined between adjacent ones of the outer cogs 230f, and an air in the interspace S between the conveyer belt 230 and the corrugated paperboard sheet D is evacuated through the outer grooves 230e/the vacuum suction holes 230c/the inner grooves 230a of the conveyer belt 230, and the upper grooves 220a/the holes 220c of the air guide bar 220. As above, the outer grooves 230e each formed to extend in the widthwise direction of the conveyer belt 230 and arranged side-by-side in the transfer direction are provided on the outer peripheral surface of the conveyer belt 230. Thus, a contact area between the corrugated paperboard sheet D and a vacuum atmosphere can be increased to effectively obtain a vacuum suction force for holding the corrugated paperboard sheet D, and an air in the interspace S between the conveyer belt 230 and the corrugated paperboard sheet D can be more effectively evacuated through the outer grooves 230e/the vacuum suction holes 230c/the inner grooves 230a of the conveyer belt 230, the upper grooves (first path) 220a/holes (second path) 220c of the air guide bar 220 and the holes (evacuation passages) 208c of the belt support holes 208c. This makes it possible to more reliably transfer the corrugated paperboard sheet D.

Figure 14:
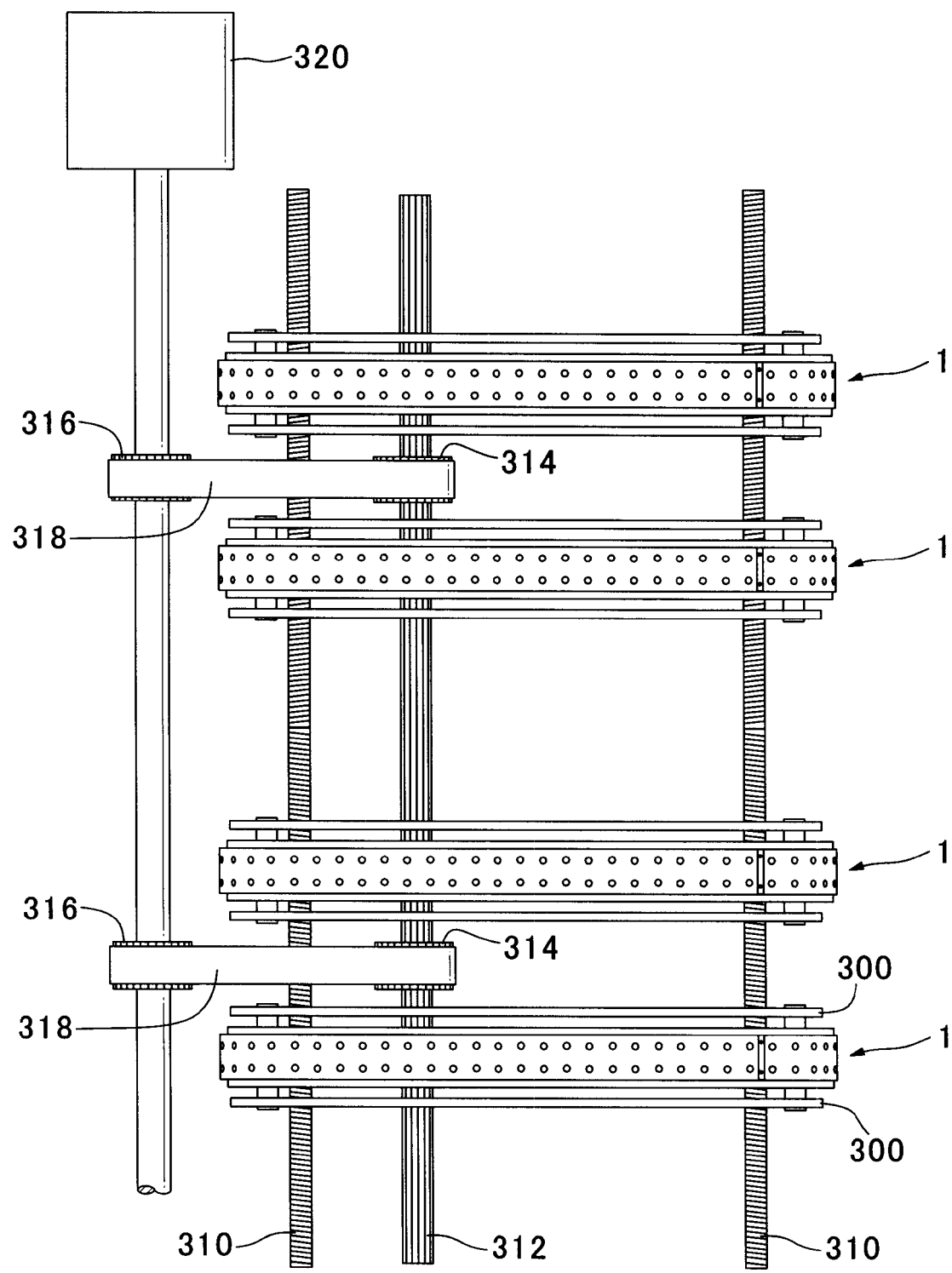
FIG. 14 is a top plan view showing the suction-type sheet feeding system in FIG. 13.

With reference to FIGS. 13 and 14, a suction-type sheet feeding system employing the transfer apparatus according to any one of the first to fourth embodiments will be described below. FIG. 13 is a perspective view showing the suction-type paperboard feeding system employing the transfer apparatus according to any one of the first to fourth embodiments, and FIG. 14 is a top plan view showing the suction-type sheet feeding system in FIG. 13.

As shown in FIGS. 13 and 14, the transfer apparatus 1 according to any one of first to fourth embodiments is installed between a pair of frames 300, and supported by the frames 300 in such a manner that a pivot shaft 340 of each of two driven rolls 302 of the transfer apparatus 1 is supported by the frames 300.

The conveyer belt (timing belt) 30 (130, 131, 230) of the transfer apparatus 1 is driven by a driving roll 306. A vent pipe 308 for leading ambient air to the vent holes 8d (108d, 208d) extends from the transfer apparatus laterally outwardly.

The frames 300 are supported by a pair of ball screws 310, as shown in FIGS. 13 and 14, and the ball screw 310 can be rotated to move the frames in a widthwise direction, as shown in FIG. 14. This sheet feeding system incorporates a plurality of the transfer apparatuses 1, as shown in FIG. 14.

As shown in FIG. 13, a gear shaft 312 is attached to the driving roll 306. Further, as shown in FIG. 14, a driven-roller gear 314 is attached to the gear shaft 312, and adapted to be driven by a belt 318 which is driven by a driving-roll gear 316. The driving-roll gear 316 is adapted to be drivenly rotated by a motor 320.

As shown in FIG. 13, a corrugated paperboard sheet D transferred by the transfer apparatus 1 is further transferred in a downstream direction by a feed roller 330.

Figure 15:
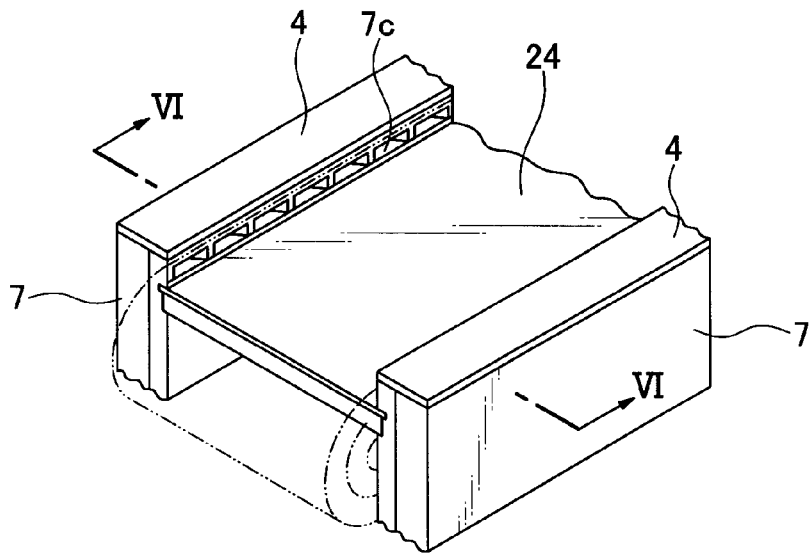
FIG. 15 is a fragmentary partially-broken perspective view showing one example of modification of a transfer apparatus according to the present invention.
Figure 16:
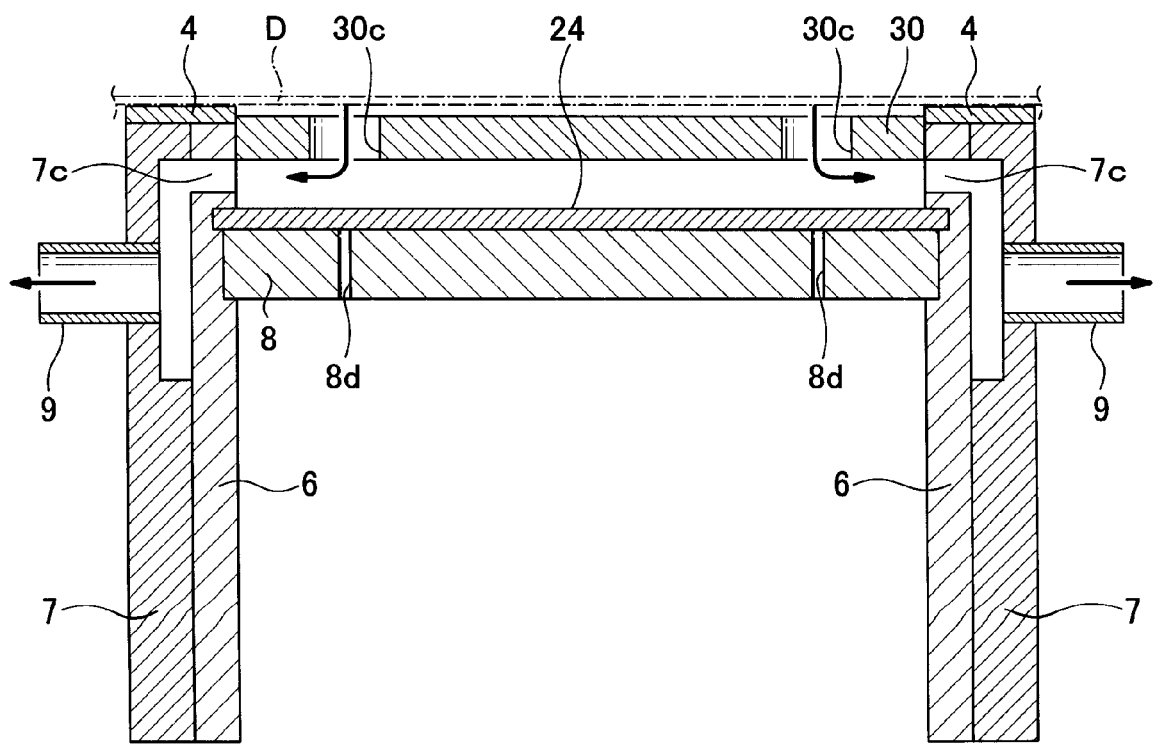
FIG. 16 is a sectional view showing the example of modification of the transfer apparatus, taken along the line VI-VI in FIG. 15.

In the first to forth embodiments, the holes 8c (208c) are formed in a central portion of the belt support member 8 (108, 208). Alternatively, as shown in an example of modification illustrated in FIGS. 15 and 16, a plurality of holes 7c may be formed on each of right and left sides of the belt support member. In this case, air evacuated from the holes 7c is discharged from a plurality of passages 9, as shown in FIG. 16. In FIG. 16, the conveyer belt 30 is omitted. In the first to forth embodiments, the holes 8c (208c) are formed in the belt support member. Alternatively, the holes 8c (208c) may be formed in the top plate bases 6 in such a manner as to be communicated with the inner grooves 30a of the conveyer belt 30.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. An apparatus for transferring a sheet from an upstream side to a downstream side, said apparatus comprising:
   an evacuation mechanism;
   a belt member, provided with a plurality of vacuum suction holes to allow the belt member to vacuum-suck the sheet, for transferring the vacuum-sucked sheet, in response to activating the evacuation mechanism;
   a belt support member for supporting the belt member from therebeneath when the evacuation mechanism is in a deactivated state, said belt supporting member being provided with a plurality of evacuation passages communicating the evacuation mechanism and the respective vacuum suction holes of the belt member; and a pair of sheet support members, disposed on respective opposite sides of the belt member, for supporting the sheet at a height position higher than that of an uppermost region of an outer peripheral surface of the belt member by a given distance, in such a manner as to define an interspace between the uppermost region of an outer peripheral surface of the belt member and a bottom surface of the sheet when the evacuation mechanism is in the deactivated state, wherein, in response to activating the evacuation mechanism, an air in the interspace between the belt member and the sheet is evacuated from the vacuum suction holes and through the evacuation passages, so that the belt member is displaced upwardly by a resulting vacuum suction force to vacuum-suck the sheet and transfer the sheet.

2. The apparatus according to claim 1, wherein the belt member is a timing belt having an inner peripheral surface which is provided with a plurality of inner cogs each formed to extend in a widthwise direction thereof and arranged side-by-side in a transfer direction, in such a manner as to be engageable with a driving roll, and a plurality of inner grooves defined between adjacent ones of the inner cogs, and wherein each of the vacuum suction holes is formed correspondingly to a respective one of the inner grooves, whereby, in response to activating the evacuation mechanism, an air in the interspace between the belt member and the sheet is evacuated through the vacuum suction holes, the inner grooves and the evacuation passages.

3. The apparatus according to claim 2, wherein said apparatus further comprises a sealing belt, disposed between the belt support member and the belt member, for sealing the inner grooves by being displaced upwardly together with the belt member, wherein the belt support member is formed with a vent hole for allowing air to get into and out from between the belt support member and the sealing belt.

4. The apparatus according to claim 3, wherein each of the sheet support members is formed with an elongate groove having a thickness approximately equal to that of the sealing belt and extending in the transfer direction, and the sealing belt is fittingly received in the elongate grooves.

5. The apparatus according to claim 3, wherein said apparatus further comprises an air guide bar disposed on a widthwise intermediate portion of the belt support member to extend in the transfer direction, and formed with a plurality of first paths each extending in a widthwise direction thereof, and a plurality of second paths each having an upper open end communicated with a corresponding one of the first paths and extending downwardly from the upper open end to have a lower open end oriented downwardly, wherein each of the evacuation passages is formed in the widthwise intermediate portion of the belt support member and beneath a respective at least one of the second paths, and wherein each of the first paths is communicated with a respective at least one of the inner grooves, and each of the second paths is communicated with a respective one of the evacuation passages, whereby, in response to activating the evacuation mechanism, an air in the interspace between the belt member and the sheet is evacuated through the vacuum suction holes, the inner grooves, the first and second paths and the evacuation passages.

6. The apparatus according to claim 3, wherein the outer peripheral surface of the belt member is provided with a plurality of outer cogs each formed to extend in the widthwise direction thereof and arranged side-by-side in the transfer direction, and a plurality of outer grooves defined between adjacent ones of the outer cogs, whereby, in response to activating the evacuation mechanism, an air in the interspace between the belt member and the sheet is evacuated through the outer grooves, the vacuum suction holes, the inner grooves and the evacuation passages.

7. The apparatus according to claim 3, wherein said apparatus further comprises an air guide bar disposed on a widthwise intermediate portion of the belt support member to extend in the transfer direction, and formed with a plurality of first paths each extending in a widthwise direction thereof, and a plurality of second paths each having an upper open end communicated with a corresponding one of the first paths and extending downwardly from the upper open end to have a lower open end oriented downwardly, wherein each of the evacuation passages is formed in the widthwise intermediate portion of the belt support member and beneath a respective at least one of the second paths, and the outer peripheral surface of the belt member is provided with a plurality of outer cogs each formed to extend in the widthwise direction thereof and arranged side-by-side in the transfer direction, and a plurality of outer grooves defined between adjacent ones of the outer cogs, and wherein each of the outer grooves is communicated with a respective at least one of the vacuum suction holes formed correspondingly to the inner grooves, each of the inner grooves being communicated with a respective at least one of the first paths, and each of the second paths being communicated with a respective one of the evacuation passages, whereby, in response to activating the evacuation mechanism, an air in the interspace between the belt member and the sheet is evacuated through the outer grooves, the vacuum suction holes, the inner grooves, the first and second paths and the evacuation passages.

8. The apparatus according to according to claim 3, wherein the outer peripheral surface of the belt member is formed in a flat shape capable of carrying the sheet.

9. The apparatus according to claim 5, wherein the sealing belt is disposed across the air guide bar.

10. The apparatus according to claim 5, wherein the air guide bar is mounted in a mount groove formed in the widthwise intermediate portion of the belt support member to extend in the transfer direction.

11. The apparatus according to claim 5, wherein said apparatus further comprises a sealing plate, provided between the air guide bar and the belt member, for sealing the air guide bar from thereabove, wherein the air guide bar has a plurality of grooves extending in the widthwise direction thereof and defining the first paths in cooperation with the sealing plate.

12. The apparatus according to claim 11, wherein the belt member is formed as a single piece in the widthwise direction thereof and between the sheet support members, the belt member having a recess formed in a bottom surface of the widthwise intermediate portion thereof to receive therein the sealing plate and at least a part of the air guide bar.

13. The apparatus according to claim 11, wherein the belt member includes a first belt member and a second belt member which are disposed on respective opposite sides of the sealing plate and at approximately the same height position, each of the first and second belt members having opposite lateral surfaces sealed by the sealing plate and a corresponding one of the sheet support members.

14. The apparatus according to claim 3, wherein each of the evacuation passages of the belt support member is formed as a through-hole penetrating through the belt support member in an upward-downward direction, and the evacuation mechanism includes an evacuation box disposed beneath the through-holes.

15. The apparatus according to claim 5, wherein each of the evacuation passages of the belt support member is formed as a through-hole penetrating through the belt support member in an upward-downward direction, and the evacuation mechanism includes an evacuation box disposed beneath the through-holes.

16. The apparatus according to claim 5, wherein each of the evacuation passages of the belt support member includes a first evacuation passage having an upper open end at a top surface of the belt support member and extending downwardly from the upper open end, a second evacuation passage communicated with a lower open end of the first evacuation passage and disposed below the first evacuation passage to extend a widthwise direction of the belt support member, and a third evacuation passage having an upper open end communicated with the second evacuation passage and a lower open end at a bottom of the belt support member, wherein:

the third evacuation passages are formed relative to the respective second evacuation passages at different positions in the widthwise direction; and the evacuation box of the evacuation mechanism comprises a plurality of evacuation boxes arranged in side-by-side relation corresponding to the positions of the third evacuation passages, in the widthwise direction.

17. The apparatus according to claim 5, wherein said apparatus continuously transfers a plurality of types of sheets each having a different length, wherein:

the belt member is adapted to allow a leading edge of each of the sheets to be placed at a given position thereof; and the vacuum suction holes are formed only in a sub-region extending from the given position in an upstream direction by a length of a shortest one of the sheets, in a region extending from the given position in the upstream direction by a length of a longest one of the sheets.

18. The apparatus according to claim 5, wherein each of the first paths of the air guide bar is formed in a shape having a width which gradually narrows toward a corresponding one of the second paths, in top plan view.

\* \* \* \* \*